(12) United States Patent
Parker et al.

(10) Patent No.: US 8,370,744 B2
(45) Date of Patent: Feb. 5, 2013

(54) USER INTERFACE FOR OPERATING A COMPUTER FROM A DISTANCE

(75) Inventors: Kathryn L. Parker, Sammamish, WA (US); William T. Flora, Jr., Seattle, WA (US); Jeffrey C. Fong, Seattle, WA (US); Mark R. Gibson, Seattle, WA (US); Mark D. MacKenzie, Seattle, WA (US); Molly Scoville Rhoten, Seattle, WA (US); Tandy W. Trower, Woodinville, WA (US); Mark Jeffrey Weinberg, Kirkland, WA (US); Christopher Daniel Williams, Bellview, WA (US); Rodger William Benson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1990 days.

(21) Appl. No.: 10/174,619

(22) Filed: Jun. 19, 2002

(65) Prior Publication Data
US 2003/0234804 A1 Dec. 25, 2003

(51) Int. Cl.
*G06F 3/048* (2006.01)
(52) U.S. Cl. ........ 715/718; 715/730; 715/740; 345/169; 725/37
(58) Field of Classification Search .................. 715/810, 715/718, 730, 740, 274; 345/169; 348/14.05, 348/150; 725/37
See application file for complete search history.

(56) References Cited

U.S. PATENT DOCUMENTS

| | | | |
|---|---|---|---|
| 5,517,257 A | 5/1996 | Dunn et al. | |
| 5,585,838 A | 12/1996 | Lawler et al. | |
| 5,600,368 A | 2/1997 | Matthews | |
| 5,606,374 A * | 2/1997 | Bertram | ........................ 725/37 |
| 5,623,613 A | 4/1997 | Rowe et al. | |
| 5,648,824 A | 7/1997 | Dunn et al. | |
| 5,654,748 A | 8/1997 | Matthews | |
| 5,677,708 A | 10/1997 | Matthews et al. | |
| 5,699,107 A | 12/1997 | Lawler et al. | |
| 5,721,829 A | 2/1998 | Dunn et al. | |
| 5,724,492 A | 3/1998 | Matthews et al. | |
| 5,751,282 A | 5/1998 | Girard et al. | |
| 5,758,258 A | 5/1998 | Shoff et al. | |
| 5,805,763 A | 9/1998 | Lawler et al. | |
| 5,812,123 A | 9/1998 | Rowe et al. | |
| 5,815,145 A | 9/1998 | Matthews | |
| 5,838,320 A | 11/1998 | Matthews, III et al. | |
| 5,874,985 A | 2/1999 | Matthews | |
| 5,900,905 A | 5/1999 | Shoff et al. | |
| 5,907,323 A | 5/1999 | Lawler et al. | |
| 5,914,746 A | 6/1999 | Matthews et al. | |

(Continued)

FOREIGN PATENT DOCUMENTS

EP 1008933 A2 6/2000
WO 0180215 A1 10/2001

OTHER PUBLICATIONS

EPC Search Report dated Oct. 26, 2011 in EP 04006439, 3 pages.

*Primary Examiner* — Namitha Pillai
(74) *Attorney, Agent, or Firm* — Shook, Hardy & Bacon L.L.P.

(57) ABSTRACT

A new user interface, a distance user interface, in a computer system for operating a computer from a television-viewing distance is provided. A centralized display is provided enabling a user to access streaming video and sound as well as music files, video files, and picture files from a single screen. Collaborative sharing of media content is provided by enabling a computer's operations and feedback to be collectively observed from a distance.

41 Claims, 18 Drawing Sheets

U.S. PATENT DOCUMENTS

| | | | | |
|---|---|---|---|---|
| 5,956,001 | A * | 9/1999 | Sumida et al. | 345/55 |
| 6,005,602 | A | 12/1999 | Matthews | |
| 6,008,803 | A | 12/1999 | Rowe et al. | |
| 6,028,604 | A * | 2/2000 | Matthews et al. | 715/821 |
| 6,072,485 | A | 6/2000 | Barnes et al. | |
| 6,144,848 | A * | 11/2000 | Walsh et al. | 455/419 |
| 6,202,212 | B1 * | 3/2001 | Sturgeon et al. | 725/141 |
| 6,240,555 | B1 | 5/2001 | Shoff et al. | |
| 6,266,059 | B1 | 7/2001 | Matthews, III et al. | |
| 6,313,851 | B1 | 11/2001 | Matthews, III et al. | |
| 6,344,865 | B1 | 2/2002 | Matthews, III et al. | |
| 6,466,238 | B1 | 10/2002 | Berry et al. | |
| 6,469,721 | B2 | 10/2002 | Matthews, III et al. | |
| 6,545,722 | B1 * | 4/2003 | Schultheiss et al. | 348/552 |
| 6,631,523 | B1 | 10/2003 | Matthews, III et al. | |
| 6,651,251 | B1 | 11/2003 | Shoff et al. | |
| RE38,376 | E | 12/2003 | Matthews, III | |
| 6,724,405 | B2 | 4/2004 | Matthews, III et al. | |
| 6,756,997 | B1 * | 6/2004 | Ward et al. | 715/716 |
| 6,784,855 | B2 | 8/2004 | Matthews et al. | |
| 6,898,765 | B2 | 5/2005 | Matthews, III et al. | |
| 6,971,071 | B1 | 11/2005 | Impas et al. | |
| 7,155,729 | B1 | 12/2006 | Andrew et al. | |
| 7,183,999 | B2 | 2/2007 | Matthews et al. | |
| 7,328,450 | B2 * | 2/2008 | Macrae et al. | 725/42 |
| 2002/0196268 | A1 * | 12/2002 | Wolff et al. | 345/718 |

* cited by examiner

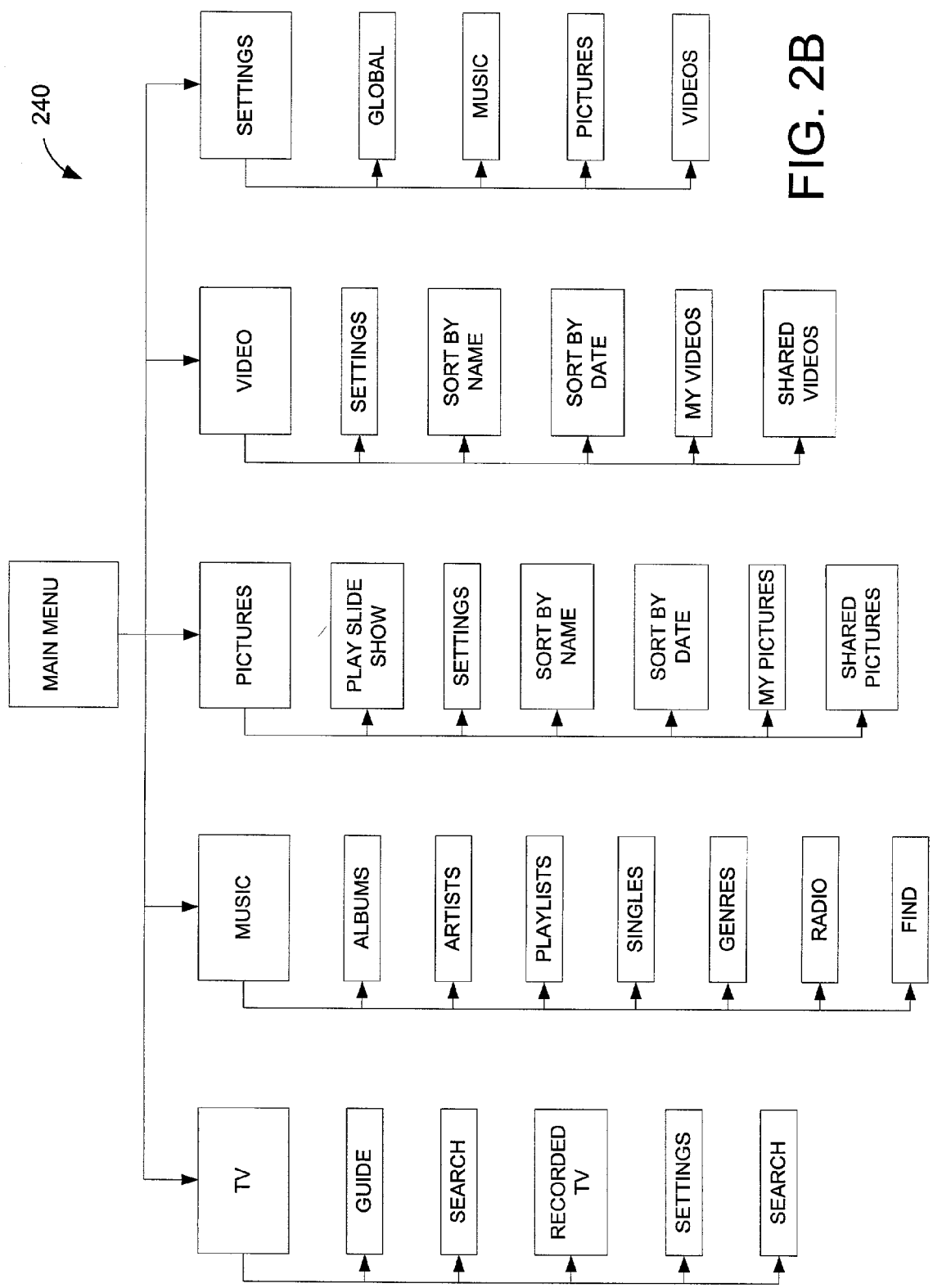

USER INTERFACE FOR OPERATING A COMPUTER FROM A DISTANCE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to user interfaces for operating computers. More particularly, the present invention provides a method and apparatus for enabling the operation of a personal computer from a distance.

BACKGROUND OF THE INVENTION

Today's personal computer user interfaces (UI), such as that implemented in the "Windows 95" Operating System produced by Microsoft Corporation of Redmond, Wash., are designed for optimum interaction with the user (end-user) operating in close proximity to the computer and monitor. One might refer to this as a "two-foot user interface" (2'UI) since the user interacts approximately within two feet of the computer, monitor, keyboard, and mouse. This design makes it impractical to interact with the computer from a longer distance.

In contrast, a television (TV) is often viewed at a distance, or from across a room. But a typical 2'UI, with its small text and small icons, could not be used to operate a computer from a commensurate distance. A computer equipped with a Distance User Interface (DUI) could be so operated. Accordingly, one practical application in the technical arts of the present invention is providing for the operation of a computer at a television-viewing distance by providing a DUI.

Interaction with Personal Computers (PCs) can be extended into entertainment centerpieces. Although the PC can be the center of productivity in most homes, no longer are computers being used to merely write a letter or create a spreadsheet. As important as such functions are, there is a growing demand to move the computer from the office to the living room because of its entertainment-providing potential. To share media content such as digital photographs and digitized videos, people must huddle around a computer running a 2'UI operated by a user in close proximity. There exists a problem with easily accessing media content stored on a computer. Such a problem can be solved by providing a DUI, which can be comfortably viewed and easily used to operate the computer from a distance, approximately equal to a television-viewing distance. With a new, easy-to-navigate user interface and a simple remote control, users will have a more relaxed way to enjoy their music, videos and photos with friends and family from their PC.

Previous attempts have been made to create a computer distance-viewing experience. For instance, couplings and adapters exist whereby the output from a computer can be displayed on a conventional, large television or large plasma display device. This attempt, however, does not address the operability of the user interface. Rather, it merely makes a 2'UI bigger. A larger 2'UI does not offer the advantages of the DUI disclosed by the present invention, such as the ease of operation from a distance with a remote control device.

There exists a need for a distance user interface, which can provide the ability to operate a computer from across a room, or at a distance commensurate with a television-viewing distance for a TV similar in size to a chosen display.

SUMMARY OF THE INVENTION

The present invention provides several useful, concrete and tangible results, including a new user interface, enabling a computer user to operate a computer from a television-viewing distance. The present invention enables users to access their favorite digital media content on their PC from a distance and share the media experience with others in a room. Several operative functions, including controlling television viewing from a distance, playing music stored on the computer and receiving visual confirmation of what is being played from a distance, accessing digital photographs stored in the computer system, and controlling the playback of videos stored on a computer from a distance are made available by the present invention. For example, users will be able to easily find and play their favorite music from across the room in a variety of formats like CDs, WINDOWS Media Audio and MP3 format. From a television-viewing distance, they will be able to browse music cover artwork from a PC music collection, share family photos with automatic slideshows that combine music and photos, watch DVDs, streaming programming, and recorded video, and enjoy Internet-delivered content such as game playing and web-casts.

The present invention includes a system, method, and article for operating a computer from a television-viewing distance. In one aspect of the present invention, a user interface is provided that has a display that includes at least one selectable link, which has a functional identifier discernable by a user from a television-viewing distance. Also included on the display is a selectable-link marker that denotes a tentative selection of the selectable link. The selectable-link marker lets the user know what item on the display has the focus.

In another aspect of the invention, a method is provided for displaying a distance user interface by activating the distance user interface using a remote control from a television-viewing distance. A command can be issued by the remote control to cause the distance user interface to be displayed on the computer.

In another aspect of the present invention, a method for processing user commands is provided by presenting a group of selectable links that are discernable from a television-viewing distance along with an indication that at least one of the links has the focus.

In another aspect of the invention, a computer program product is provided with computer code for presenting a graphical user interface optimized to be viewed and operated from a distance.

In still another aspect of the invention, a centralized display is provided whereby a user can access a variety of digital media via a computer such as pictures, music, recorded video, and streaming video from a centralized area. A thumbnail-type area on each screen of the DUI is provided to display a common media presentation.

In still another aspect of the present invention, a system for operating a computer from a television-viewing distance is provided. The system includes a distance user interface, a computer programmed to display the distance interface, a remote control, and a signal receiving component to receive the remote control transmission to enable the distance user interface to perform operative functions in response to the transmission.

In a final aspect of the invention, a specialized remote control is provided. This remote control can be used to toggle between the distance user interface and a conventional user interface, or any other interface of a computer system.

BRIEF DESCRIPTION OF THE SEVERAL VIEWS OF THE DRAWINGS

The present invention is described in detail below with reference to the attached drawing figures, wherein:

FIG. 2B is an illustrative site map of a distance user interface;

DETAILED DESCRIPTION OF THE INVENTION

The present invention provides a new user interface, a distance user interface, to enable PC operation from a television-viewing distance. In one embodiment of the present invention, a user displays the distance user interface by issuing a command from a remote control that is received by the computer. The distance user interface is displayed with a menu of available selectable options, or links. The distance user interface is optimized to be viewed from a television-viewing distance. When followed, these selectable links take a user to other displays topically related to functional identifiers on the menu display. A more in-depth description of the present invention will be provided below.

Having briefly described an embodiment of the present invention, an exemplary operating environment for the present invention is described below.

Exemplary Operating Environment

Figure 1:
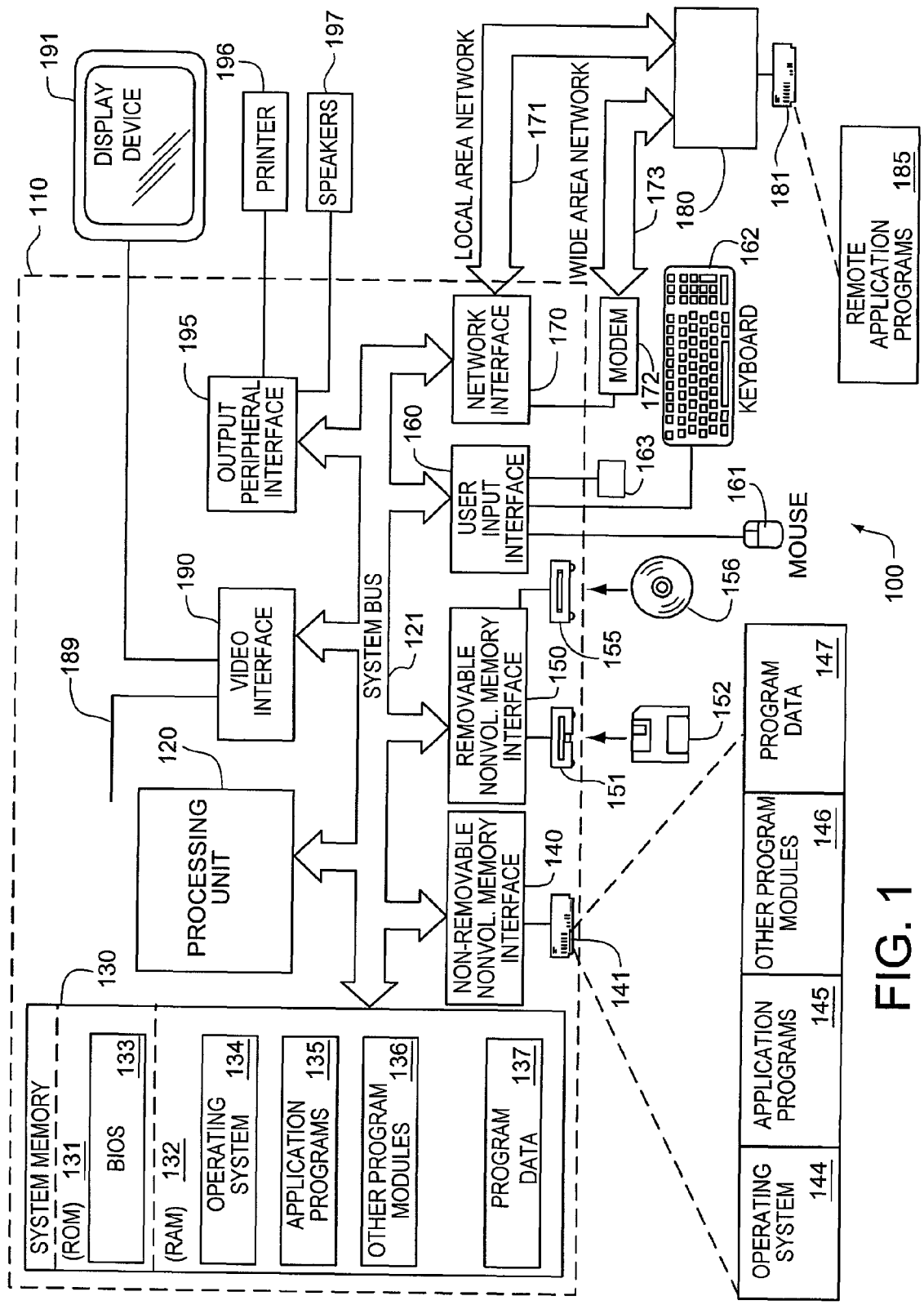
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. Examples of computer storage media include, but are not limited to, RAM, ROM, electronically erasable programmable read-only memory (EEPROM), flash memory or other memory technology, CD-ROM, digital versatile disks (DVD) or other optical or holographic disk storage, magnetic cassettes, magnetic tape, magnetic disk storage or other magnetic storage devices, or any other medium which can be used to store the desired information and which can be accessed by computer 110. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a nonremovable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they are different copies. A user may enter commands and information into the computer 110 through input devices such as a keyboard 162; pointing device 161, commonly referred to as a mouse, trackball or touch pad; and an infrared transceiver 163. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A display device 191 is also connected to the system bus 121 via an interface, such as a video interface 190. Video interface 190 could also accept in incoming video signal 189. Display device 191 can be any device to display the output of computer 110 not limited to a monitor, an LCD screen, a TFT screen, a flat panel display, a conventional television, or screen projector. In addition to the display device 191, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173 but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. For example, including various expansion cards such as television tuner cards and network interface cards within a computer 110 is conventional. Accordingly, additional details concerning the internal construction of the computer 110 need not be disclosed in connection with the present invention.

When the computer 110 is turned on or reset, the BIOS 133, which is stored in the ROM 131 instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

System and Method for Providing a Distance User Interface

As previously mentioned, the present invention may be described in the general context of computer-executable instructions such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Throughout this document, the term "TV" or "television" is used. "TV," although technically short for "television," has come to be associated with cable television, satellite television, and high-definition television.

Figure 2:
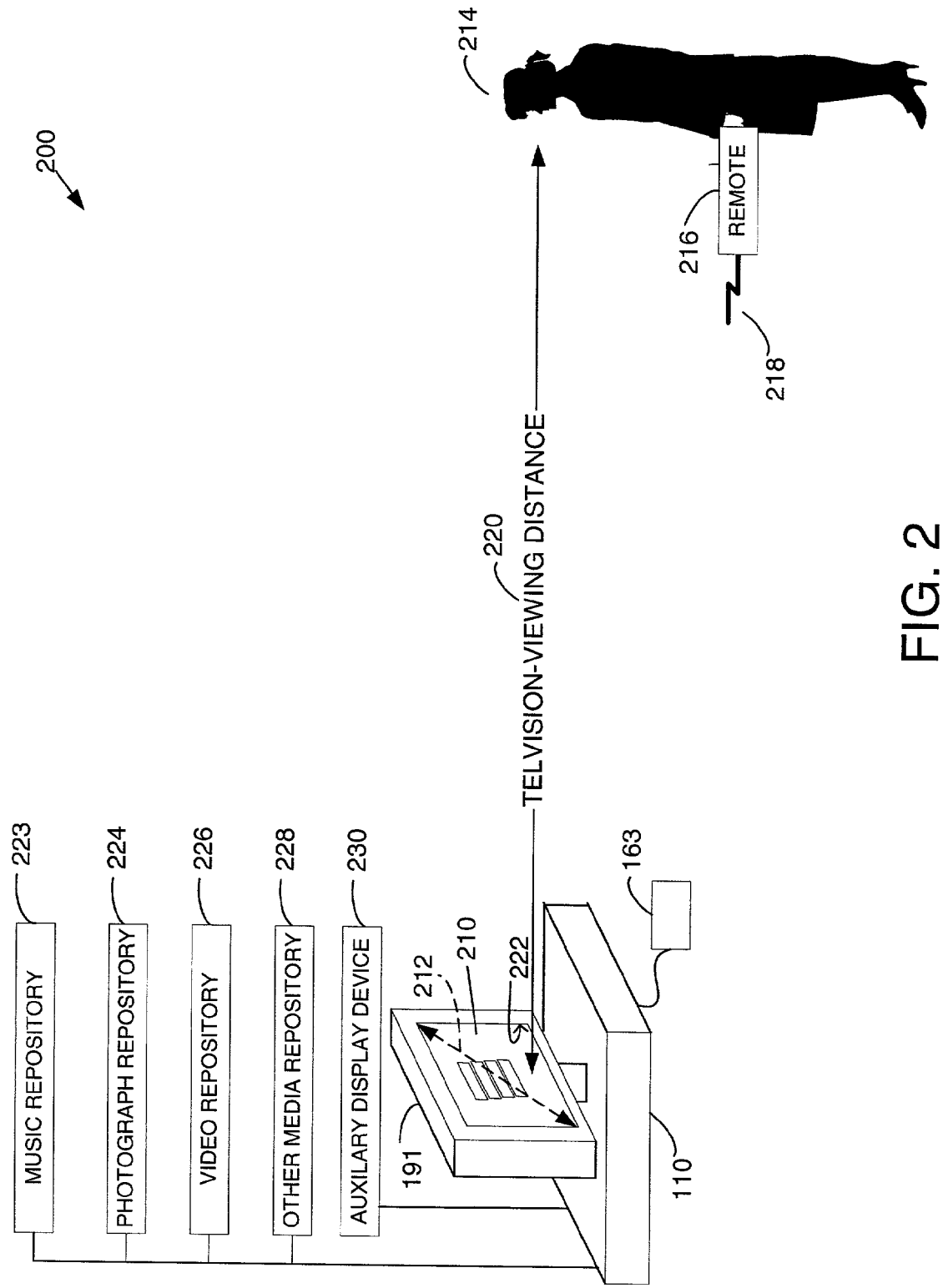
FIG. 2 is a diagram of an exemplary operating environment for practicing the present invention.

Turning now to FIG. 2, an exemplary system environment for practicing the present invention is referenced generally by the numeral 200. A distance user interface (DUI) 210 is displayed on display device 191. DUI 210 can also be displayed on other display devices coupled to computer 110. DUI 210 is a graphical user interface designed to be operated by an end-user 214 from a television-viewing distance. In a preferred embodiment, DUI 210 is displayed on a display device 191 with a resolution of 1,024×768 pixels and a visual screen area 212 of approximately sixteen inches, which is consistent with a 17" monitor. Visual screen area 212 is a measure of the diagonal of the actual image displayed on display device 191. The actual image display area has a display perimeter 222, which is the perimeter of the outermost viewable pixels.

DUI 210 is operated by end-user 214 using a remote control 216 capable of transmitting a wireless signal 218 from a television-viewing distance 220. Television-viewing distance 220 is an estimate of a distance end-user 214 would observe a television having a display area approximately the same size as visible screen area 212. Television-viewing distance 220 can vary based on the visual screen area 212 available for a particular display device 191. Television-viewing distance measured in feet is approximately half a viewable screen area of said display device measured in inches. For example, a television-viewing distance may be approximately eight to twelve feet for a display device 191 having a visible screen area 212 of approximately sixteen inches at a resolution of 1,024×768. This means that the DUI 210 can be comfortably viewed from a distance of about eight feet on a 17-inch CRT monitor.

The wireless signal 218 is received by a wireless signal receiver 163 coupled to computer 110. The wireless signal receiver 163 could be adapted to receive a variety of signals; for example infrared, radio, or wireless LAN signals.

DUI 210 is designed to provide a centralized display where an end-user 214 can easily access a variety of media content stored on computer 110. In a preferred embodiment, a single screen provides links to such content as digital pictures, digital videos, digital music, and streaming video including television programming, satellite programming, Internet programming, time-delayed recordings, and other recordings embodied on a computer readable medium. A music repository 223 stores audio content and is not limited to musical recordings. Any form of audio such as dictations can also be stored in music repository 223. Similarly, a photograph repository 224 and video repository 226 are in connection with computer 110 to store and retrieve photographs and videos. A repository for storing other media 228 is also included for storing an array of content and media formats. Each repository 223, 224, 226, and 228 preferably reside on hard drive 141.

Conventional video cards can typically include inputs to receive a composite video signal or a signal delivered via coaxial wire. Accordingly, any signal that can be inputted at least via the aforementioned inputs can be displayed on display device 191. Alternatively, the DUI 210 can be displayed on a device other than display device 191 such as auxiliary display device 230.

Figure 2A:
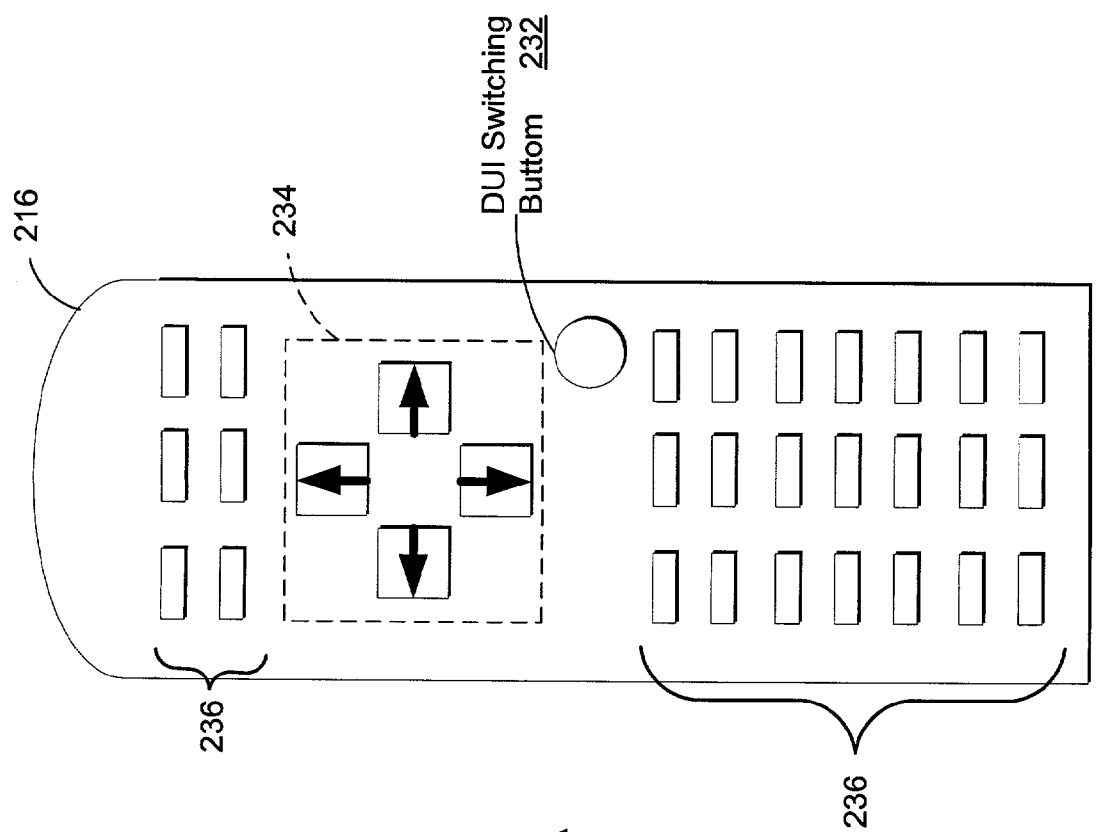
FIG. 2A is a functional diagram of an exemplary specialized remote control for practicing the present invention.

Turning now to FIG. 2A, an exemplary specialized remote control 216 is shown. The remote control 216 depicted in FIG. 2A is shown for functional purposes only. It is not meant to imply any physical design restraints or limitations. The specialized remote control 216 can operate the computer 110 from at least a television-viewing distance. The remote control has circuitry built into it such that by pressing a button, such as a DUI Switching Button 232, the DUI 210 is toggled on and off. When turned on, the DUI 210 enables remote operation from a television-viewing distance 220. When turned off, DUI 210 is not shown and computer 110 displays a conventional 2'UI, an arm's-length user interface. DUI 210 can be toggled on and off in a variety of ways. In a preferred embodiment, DUI 210 responds to the source of input. DUI 210 can be configured to be displayed when input from a wirelessly connected device is sensed. For example, when a button on the remote control 216 is pressed, DUI 210 senses the source of input as being the remote control 216 and consequently activates itself. In a preferred embodiment, the DUI 210 acts as an overlay user interface which works in tandem with various I/O devices to either display the DUI 210 or a 2'UI. For instance, when input from a wired keyboard 162 or mouse 161 is received, the 2'UI is displayed to end-user 214. Conversely, if the keyboard 162 were a wireless keyboard, DUI 210 could be displayed instead.

Also included on remote control 216 is a set of navigation buttons 234 to control the focus of the DUI 210. An item on the DUI 210 has the focus when it is ready to receive input from an input device such as the keyboard or mouse, but in this case the remote control 216. A group of functional buttons 236, for example On/Off, Pause, Frame Advance and Back, Fast Forward, Rewind, Skip Ahead, Instant Replay, Slow Motion, Advance to End/Beginning, Jump/Live TV, Record, and Stop can also be provided on remote control 216.

An exemplary site map of DUI 210 is provided in FIG. 2B and is referenced generally by the numeral 240. The exemplary site map 240 of DUI 210 is not meant to be limiting, but rather to convey an illustrative view of a DUI 210. Although the details of the screens and selectable links of site map 240 will be explained in greater detail, site map 240 illustrates that DUI 210 is comprised of a main menu, which has a first level of options such as TV, MUSIC, PICTURES, VIDEO, and SETTINGS. Each of these options from the first level has at least a second level of options that can lead to still other screens. For instance, MAIN MENU→TV→GUIDE brings up a guide. Site map 240 does not depict all levels available in DUI 210, but rather depicts a simplified overview of a possible hierarchical structure of DUI 210.

Figure 3:
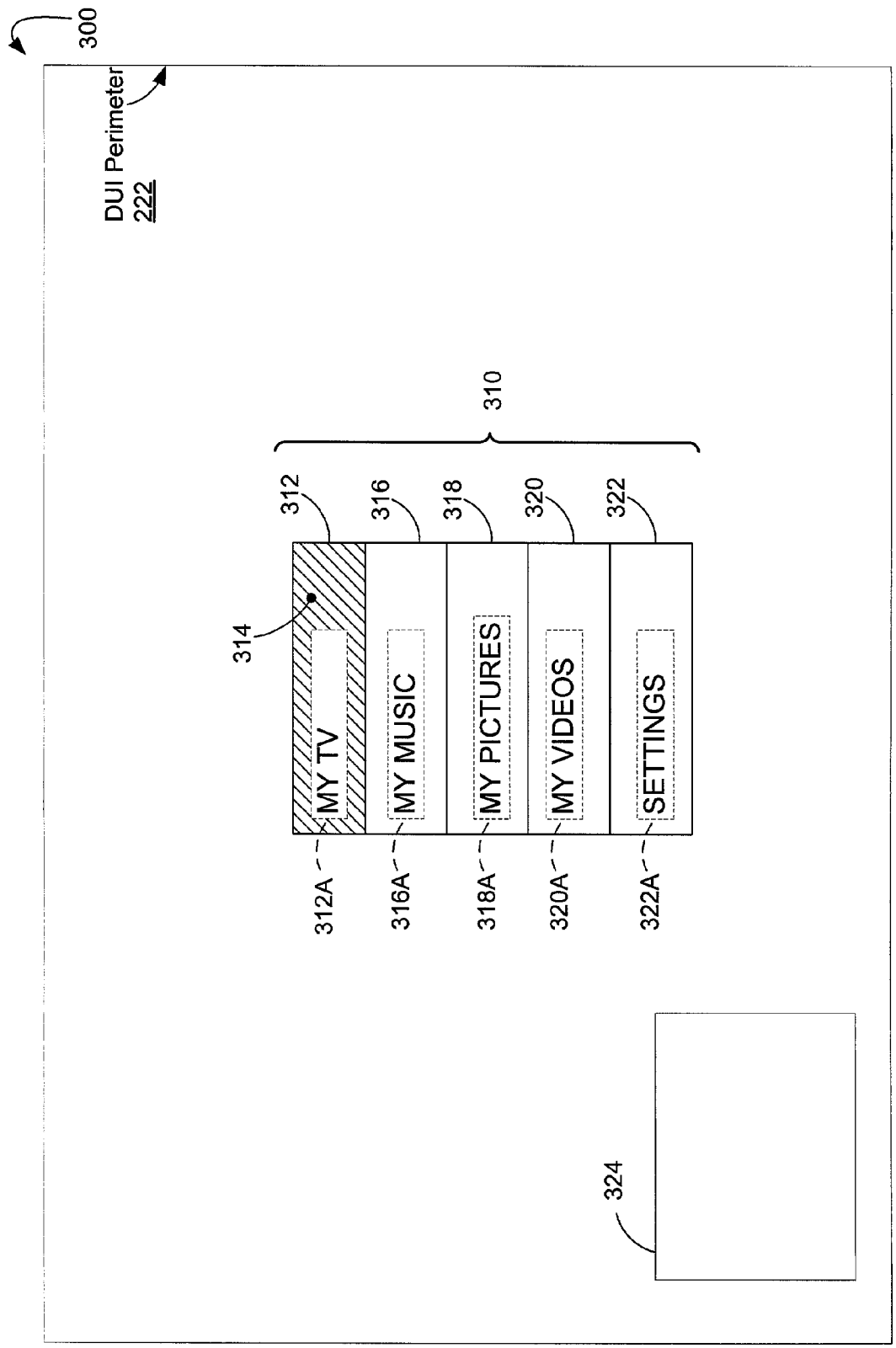
FIG. 3 is a diagram of an exemplary menu display of the present invention.

Turning now to FIG. 3, a main menu display is referenced generally by numeral 300. Main menu display 300 is an exemplary display that is first shown to end-user 214 when engaging the DUI 210. Main menu display 300 has a DUI perimeter 222 that consumes the viewable area of a display device in a preferred embodiment. Main menu display 300 includes a first group of selectable links 310 including a first selectable link 312. First selectable link 312 includes a functional identifier 312A. As shown, one function of first selectable link 312 is to view streaming media, such as television. An exemplary functional identifier 312A is shown as "My TV." This link could also be used to view a video, a DVD, satellite television, an Internet web-cast, CATV, a surveillance camera image, or to play a game, conduct instant messaging, browse the internet, listen to music, display photographs, or to present a host of other services via the interface optimized to be viewed and operated from a television-viewing distance 220. Functional identifier 312A is not limited to a textual description. For example, an icon representing a television could also be a functional identifier. The functional identifier 312A could be any text or symbol that identifies the function associating with following first selectable link 312.

Also included on main menu display 300 is a selectable-link marker 314. Selectable-link marker 314 denotes a tentative selection, or the focus, by end-user 214. Using remote control 216, an end-user 214 can control the focus of different items using navigation buttons 234. An item has the focus when it is tentatively selected such that selecting a link will follow that link. As shown in FIG. 3, the "My TV" link 312 currently has the focus. The selectable link marker 314 can take on a variety of forms. In a preferred embodiment, the selectable link marker 314 is provided in color, a background color different from the other colors of the other selectable links. For instance, each of the links in selectable link group 310 could have a background color of blue except for the link that has the focus, e.g., the "My TV" link 312, which has a background color of green. Main menu display 300 could also include second, third, fourth and fifth selectable links 316, 318, 320 and 322, respectively.

Second selectable link 316 provides a link to play music or other audio on the computer system 100 and includes a music functional identifier 316A such as "My Music," discernable from the television-viewing distance 220. Again, and as with all functional identifiers, music functional identifier 316A is not limited to a textual display but could be an icon or symbol that conveys to end-user 214 that following the link will permit the playing of digital music. Third selectable link 318 allows end-user 214 to view pictures stored on computer system 100 and includes a third functional identifier 318A such as "My Pictures" discernable from the television-viewing distance. Fourth selectable link 320 permits end-user 214 to display previously recorded material on the computer 110 and includes a fourth functional identifier 320A such as "My Videos," discernable from television-viewing distance 220. Main menu display 300 can also include a fifth selectable link 322 for manipulating the settings of the DUI 210 having a fifth functional identifier 322A such as "Settings," discernable from television-viewing distance 220.

Figure 3A:
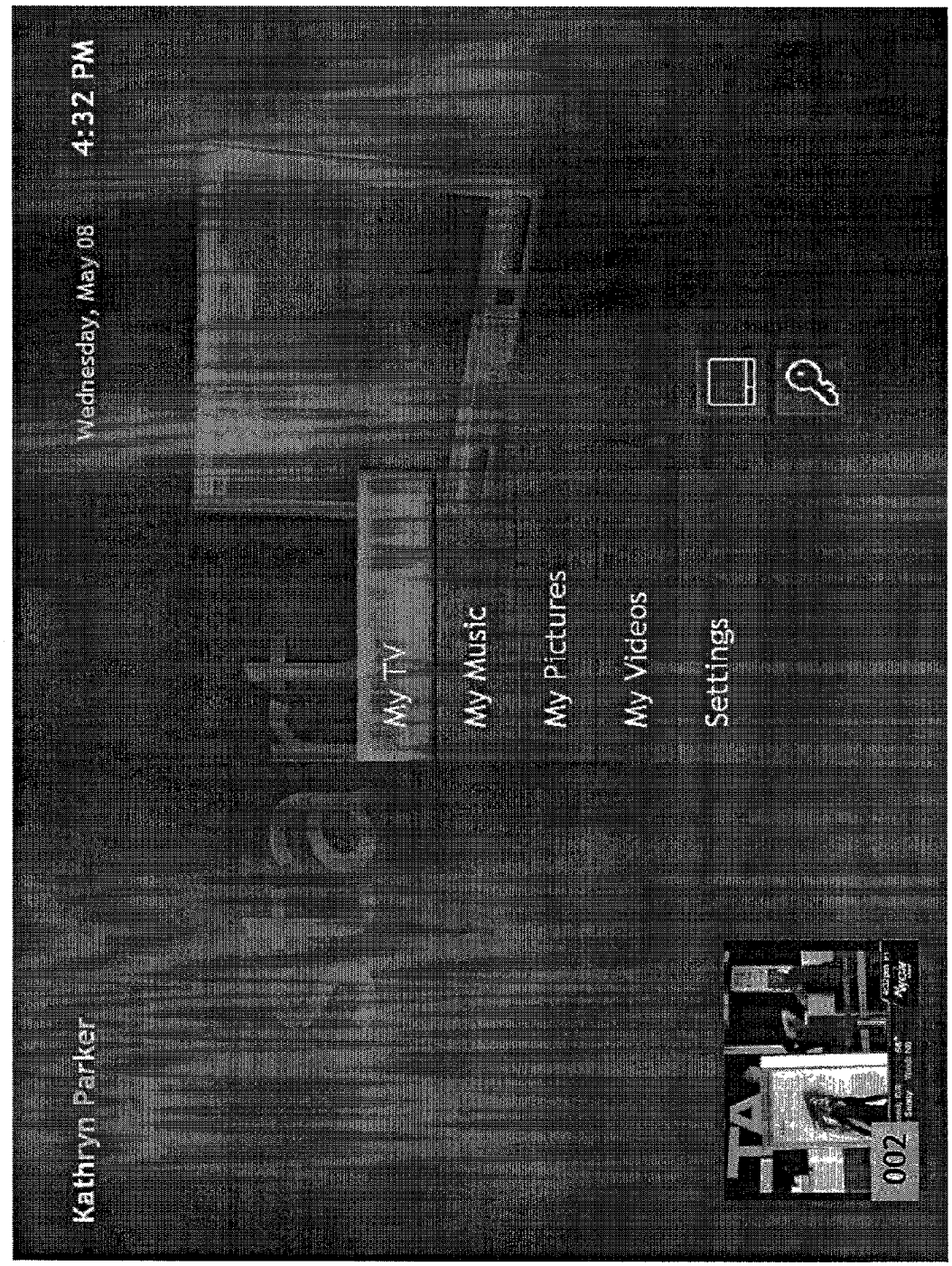
FIG. 3A is an illustrative screen shot of the exemplary menu display of FIG. 3.

Main menu display 300 also preferably includes a "now-playing" area 324 permitting an end-user 214 to persistently view currently playing media while navigating the various displays of DUI 210. This feature intelligently reduces currently playing media to a thumbnail size while an end-user 214 navigates the DUI 210. For example, if a user were to follow the "My TV" selectable link 312, choose a program to watch, and then navigate back to the menu display 300, the program is reduced to play in the now-playing area 324. This feature enables an end-user 214 to continue to enjoy currently playing content while linking to other displays. Although it could, the now-playing area 324 does not appear while viewing video full screen nor while playing a slide show in the preferred embodiment. An exemplary screen shot of menu display 300 is depicted in FIG. 3A.

Figure 4:
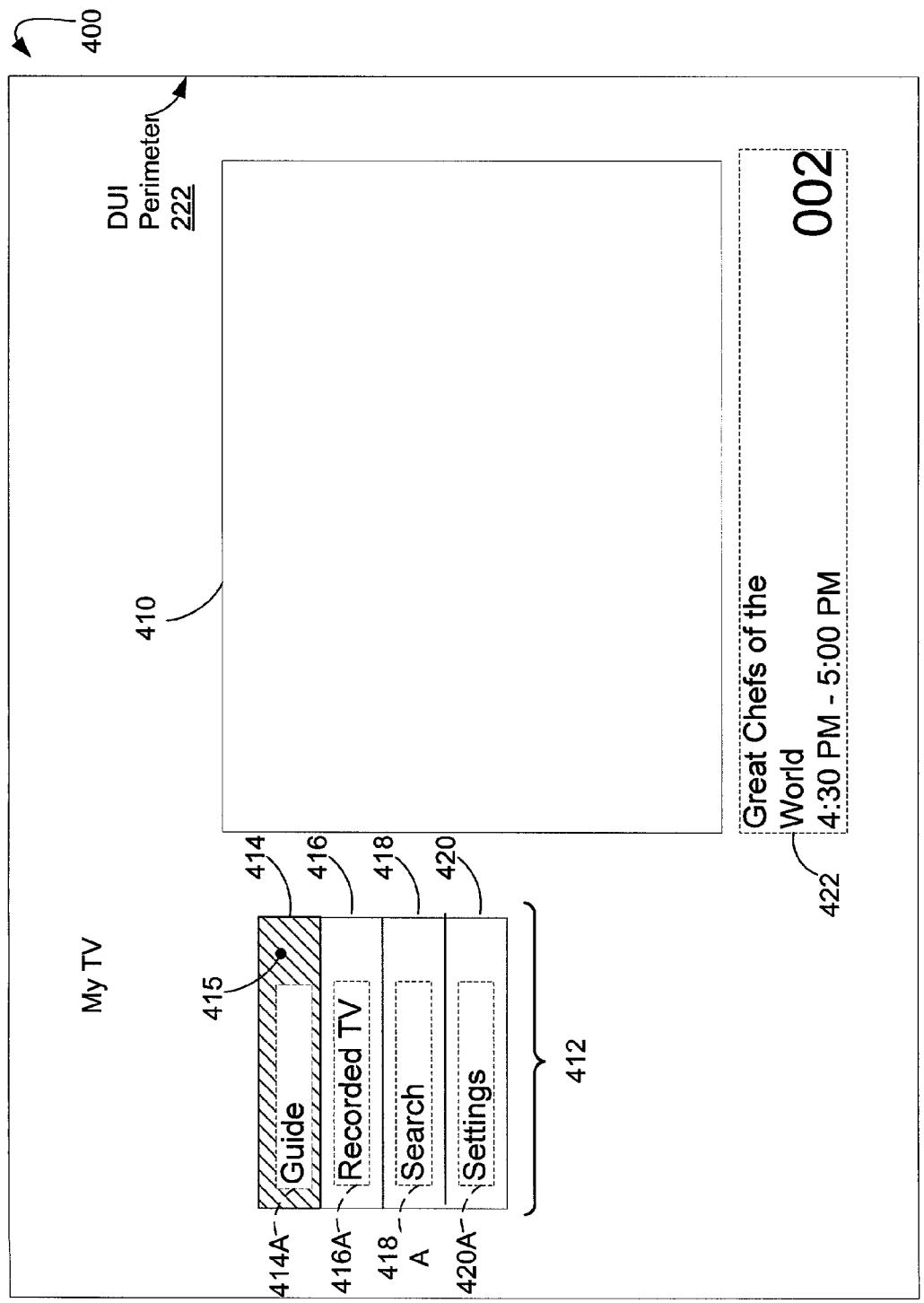
FIG. 4 is a diagram of an exemplary television-viewing display of the present invention.

Turning now to FIG. 4, following the "My TV" selectable link 312 presents the end-user 214 with a second display, a display for viewing television or other streaming media, and is referenced generally by the numeral 400. Television display 400 has DUI perimeter 222 that consumes the viewable area in a preferred embodiment. A television-viewing display area 410 is included on television display 400. Television display area 410 provides the ability for users to watch streaming video such as television programming, cable programming, satellite programming, web-casts, and stored video such as home videos, time-delayed recordings, and DVD movies. Any other type of programming provided by a content provider capable of being inputted into computer system 100 can be viewed in television display area 410, which can be maximized to occupy all of DUI perimeter 222. Television display area 410 is shown by illustration as consuming only a portion of television display 400 to more easily describe other functions available.

Also included on television display 400 is a group of selectable links 412 with corresponding functional identifiers discernable from television viewing-distance 220. Exemplary selectable links include a "Guide" link 414, a "Recorded TV" link 416, a TV "Search" link 418 and a TV "Settings" link 420. Following the "Recorded TV" link 416 allows a user to view previously recorded media content. Television is not the only form of media content that can be recorded by "Recorded TV" link 416. Rather, any media provided by a content provider such as CATV, satellite, web-casts, or pay-per-view programming is contemplated within the scope of the present invention.

"Guide" link 414 includes a guide link identifier 414A such as "Guide." A TV guide selectable link marker 415 denotes which link has the focus on television display 400. As with all selectable link markers, TV selectable link marker 415 could take on a variety of forms. As shown, TV selectable link marker 415 has a background color different from those links which do not have the focus. For example, TV selectable link marker 415 could have a background color of green while the other selectable links are blue.

Figure 4A:
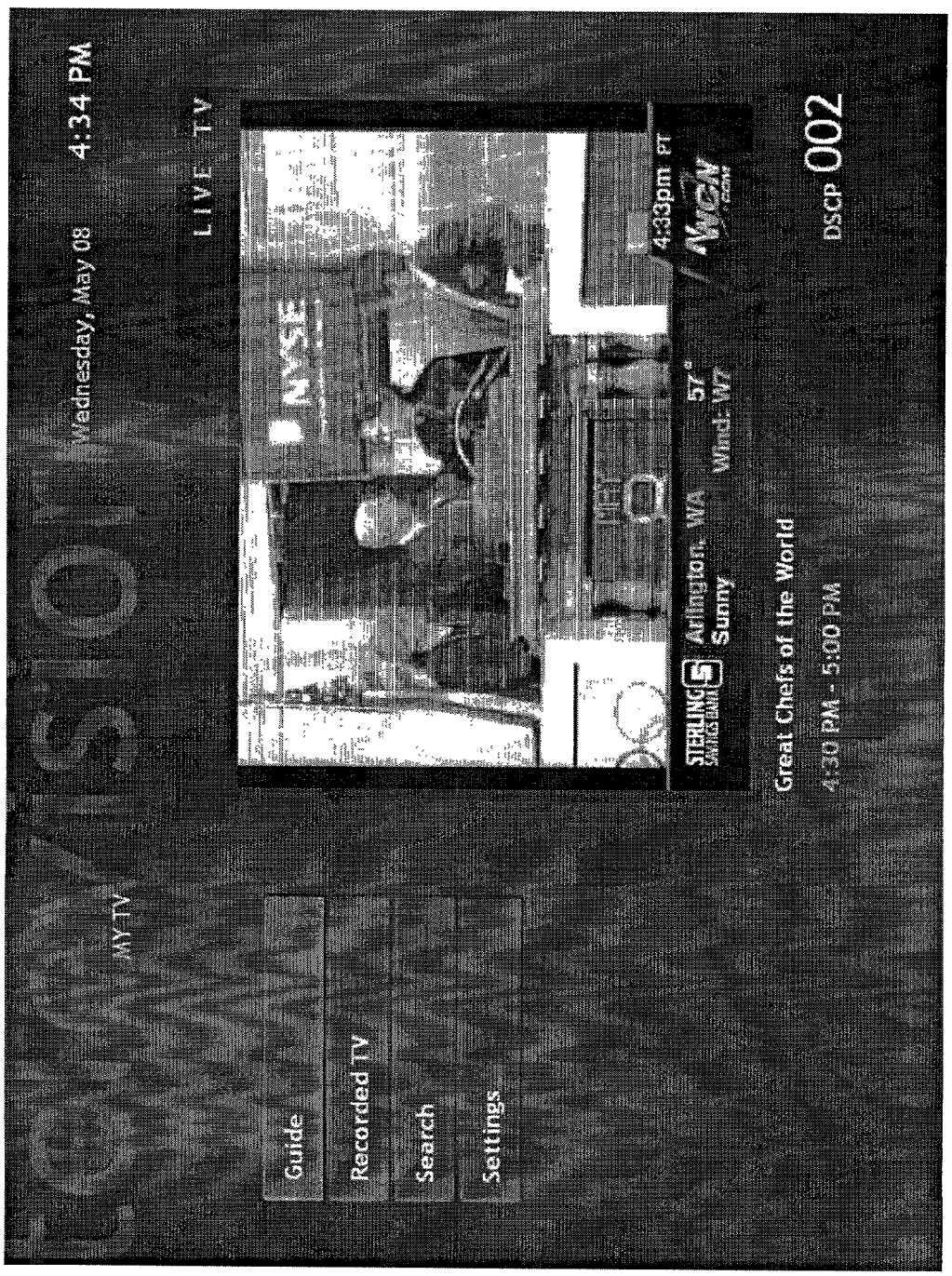
FIG. 4A is an illustrative screen shot of the exemplary television-viewing display of FIG. 4.

The "Recorded TV" link 416 includes a recorded television link identifier 416A such as "Recorded TV." Television search link 418 includes a television search link identifier 418A such as "Search." Television "Settings" link 420 includes a television link identifier 420A such as "Settings." As depicted in FIG. 4, each of the functional identifiers are text, however the identifiers need not be text. Rather, the functional identifiers could be icons or symbols associated with the functions performed by each selectable link. To help end-user 214 know what program is being viewed, a programming data area 422 is provided below television-viewing area 410. Programming data area 422 could provide many levels and types of data regarding the currently viewed program as well as a description of programming available on different channels. For example, programming data area 422 includes the title of the current program, its run-time, and the channel being viewed. A screen shot 424 of an exemplary television display 400 is provided in FIG. 4A.

Figure 4B:
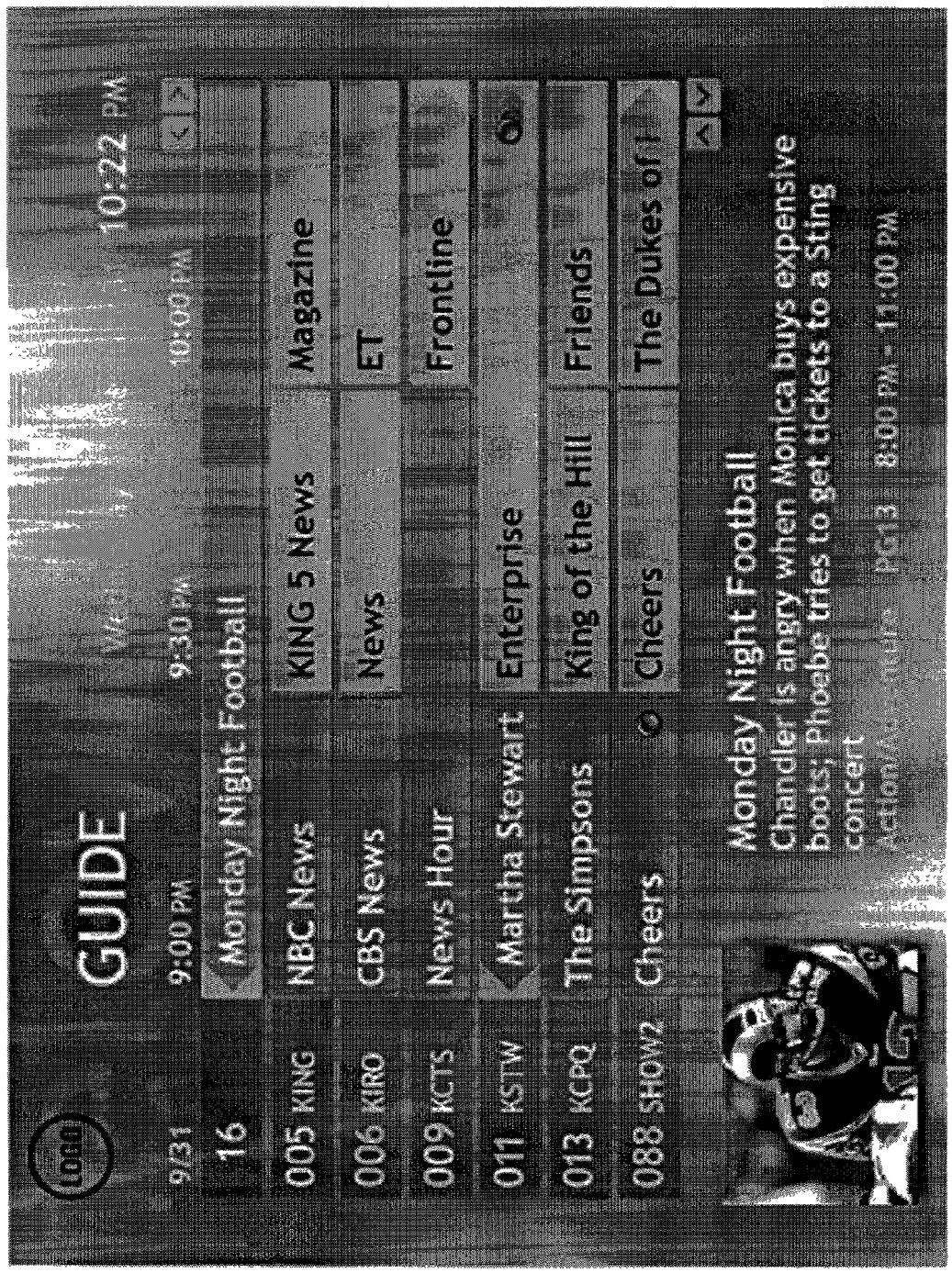
FIG. 4B is an illustrative screen shot of an exemplary television programming guide display.

Following the "Guide" link 414 presents the end-user 214 with a listing of television programming, discernable from television-viewing distance 220. A screen shot of an exemplary listing is depicted in FIG. 4B and is referenced generally by numeral 426. The "Guide" could include show times and channels as well a description of programming shows, or paid advertisements. Depending on the remote control 216 button pressed, selecting a program from the "Guide" 426 allows the user to view the program or takes a user to a screen where an option is presented to record the program.

Figure 4C:
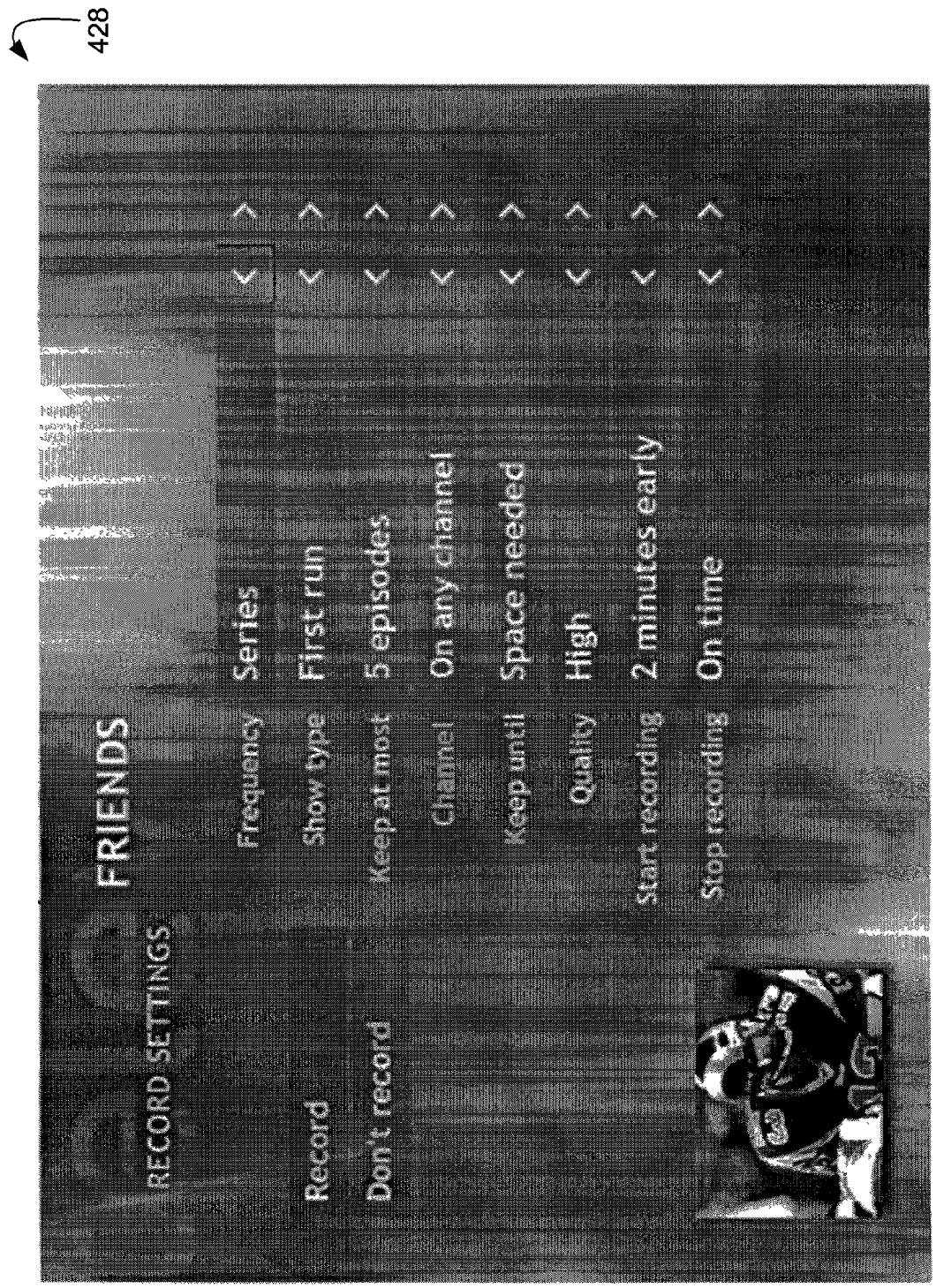
FIG. 4C is an illustrative screen shot of an exemplary television recording display.

An exemplary recording display is depicted in FIG. 4C and is referenced generally by numeral 428. A variety of recording options are preferably made available via the recording display 428 such as recording a series, only first runs, a certain number of episodes, and/or on certain channels. Administrative settings can also be adjusted, for example duration to retain, recording quality, start time and stop time. Recordings are retained in video repository 226 for later playback, and are accessed via the "Recorded TV" link 416. Live TV can be routed through a buffer to permit pausing and instant replaying of live television in a computer system.

Following TV "Search" link 418, the present invention presents a prompt whereby end-user 214 can enter search criteria to find programs of choice. End-user 214 can search for any item found in the television "Guide" 426. End-user 214 is preferably presented with various search options such as Categories, Title, and Keyword. By providing the ability for users to search available programming, the present invention provides a fast method of locating features of interest.

Figure 5:
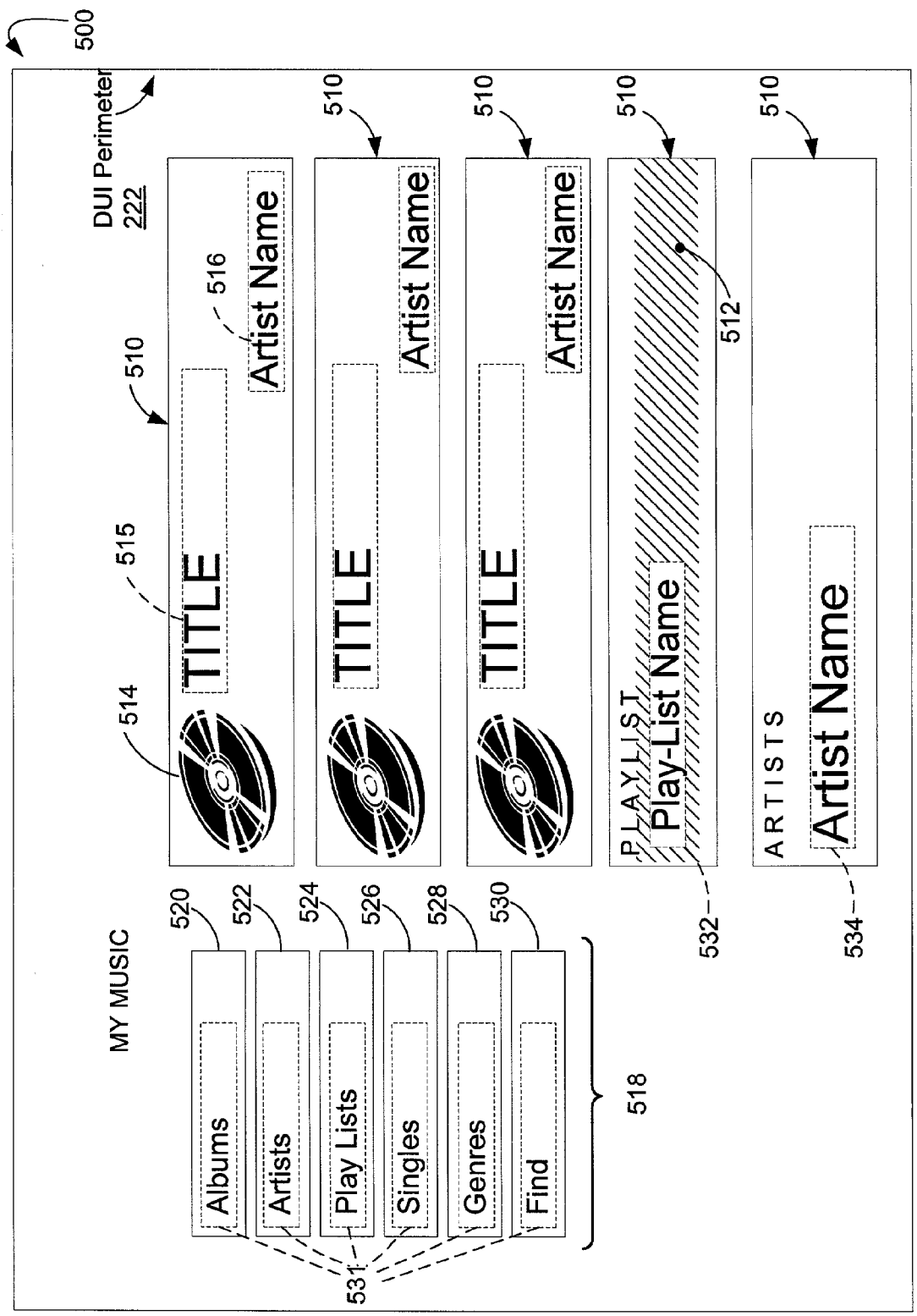
FIG. 5 is a diagram of an exemplary music listening display of the present invention.

Returning briefly to FIG. 3, second selectable link on menu display 300 is shown as the "My Music" selectable link 316. This link can be any link that permits users to peruse various music files stored on computer 110 from a distance. Turning now to FIG. 5, following the music selectable link 316 takes a user to a music listening display referenced generally by numeral 500. Music listening display 500 has DUI perimeter 222 that consumes the viewable area in a preferred embodiment. Music listening display 500 includes a music selectable link 510 for accepting a request to play a recording of music stored in music repository 223 on computer 110. A music selection identifier 512 is also included on music display area 500 and is discernable from the television viewing-distance 220. The music selection identifier 512 indicates a tentative selection and indicates what song, album, play-list, etc., is currently playing. The music selection identifier 512 can take on many forms, such as an icon or marker next to the currently playing song or, as depicted in FIG. 5, a highlighted selectable link. A picture of album art 514 can also be displayed to a user on the music display 500, as well as a track title identifier 515, and artist identifier 516.

Also included on music display area 500 is a group of music selectable links 518 enabling end-user 214 to easily navigate through the music stored in music repository 223 from television-viewing distance 220. Exemplary music selectable links include an "Albums" selectable link 520, an "Artists" selectable link 522, a "Playlists" selectable link 524, a "Singles" selectable link 526, a "Genres" selectable link 528 and a "Find" selectable link 530. Each music selectable link includes a music selectable link identifier similar to the aforementioned link identifiers and is referred to generally by numeral 531. The music selectable link identifiers 531 are discernable from television-viewing distance 220.

Figure 5A:
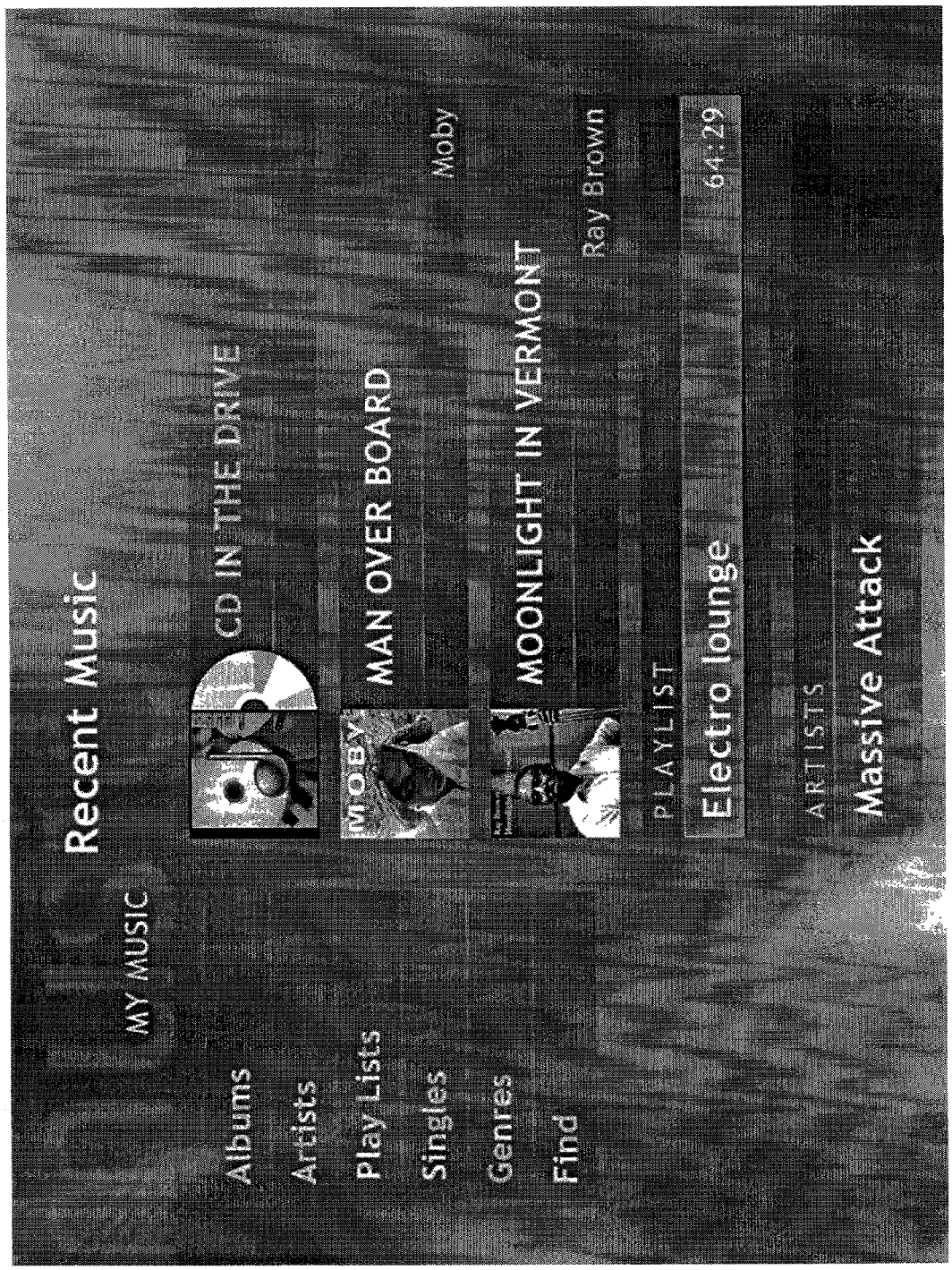
FIG. 5A is an illustrative screen shot of the exemplary music listening display of FIG. 5.

When the find music selectable link 530 is followed, the present invention presents a search form used to locate music stored on the computer system in the music repository 223. Although many methods are possible, in a preferred embodiment music searches are conducted based on a keyword search. An exemplary screen shot of a music listening area 500 is provided in FIG. 5A.

Figure 6:
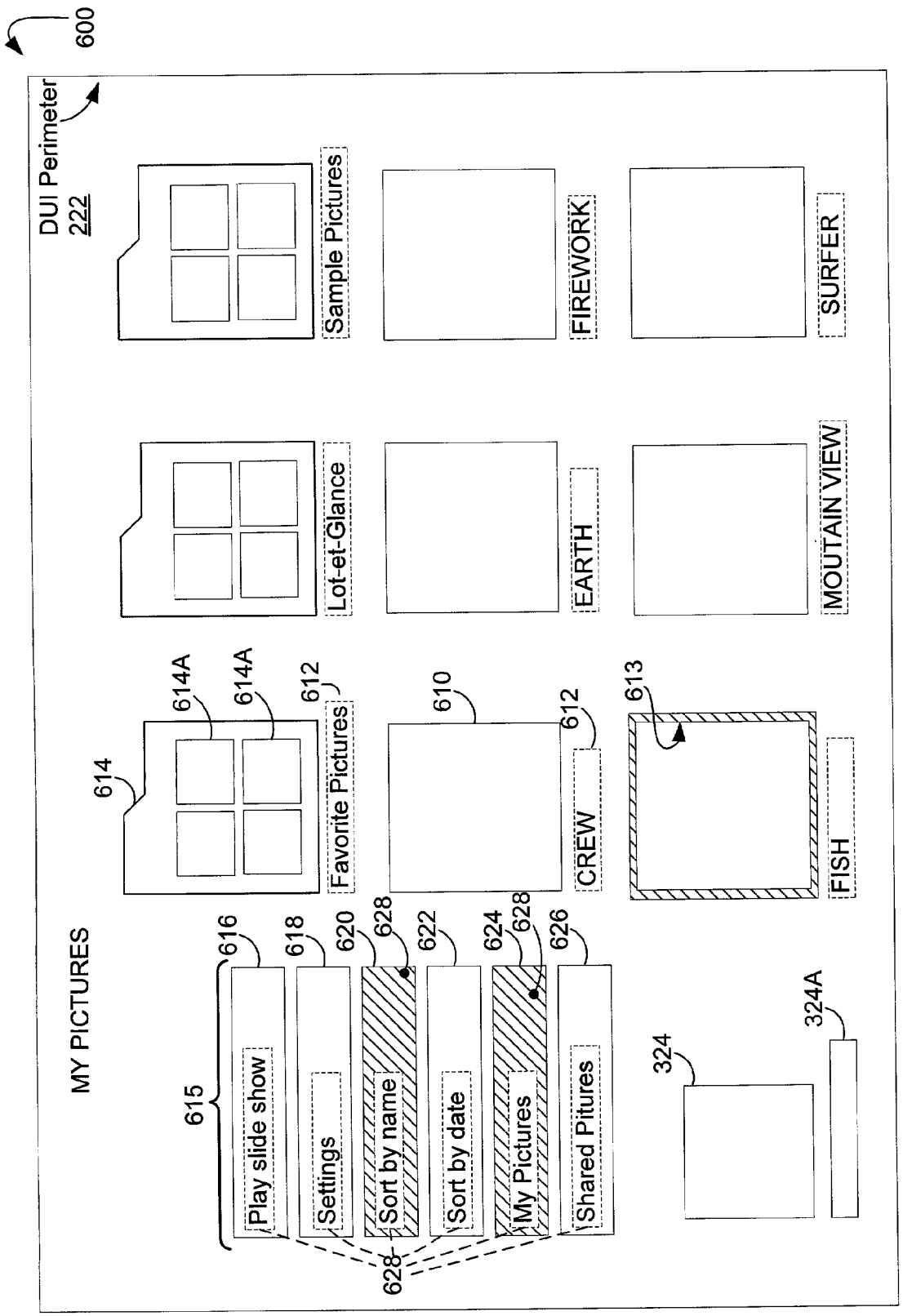
FIG. 6 is a diagram of an exemplary pictures display of the present invention.

Returning briefly to FIG. 3, following the "My Pictures" display link 318 presents a user with a pictures display area as shown in FIG. 6 and referenced generally by the numeral 600. Pictures display area has DUI perimeter 222 representing the preferred, maximized screen area. Pictures stored in the photograph repository 224 can be accessed via the pictures display 600. Photograph repository 224 can be a collection of digital photographs stored on computer 110. Photograph repository 224 could simply be the hard drive of computer 110. Included on picture display 600 are thumbnail previews of various pictures stored in photograph repository 224. These thumbnails are discernable from television-viewing distance 220, at least enough to generally recognize the content of the picture. A single picture thumbnail 610 is a small display of a larger picture. Each thumbnail picture 610 includes a picture identifier 612 such as "Favorite Pictures" or "Crew." Picture identifiers 612 need not be purely textual, but could be symbols or icons as well. A picture marker 613 denotes which item has the focus on picture display 600. The picture marker 613 can be an outline around a picture, as shown, but could also be any symbol or mark to denote which picture has the focus.

Using remote control 216, an end-user 214 can select an available thumbnail 610 to view the picture full-screen. Also available on pictures display 600 are thumbnails of picture folders 614. A picture folder thumbnail 614 depicts a small sampling preview of pictures 614A available within a specific folder. When an end-user 214 clicks on a folder thumbnail 614, the various pictures 614A within that folder 614 are displayed as individual picture thumbnails 610. Also included on picture display 600 is a group of pictures selectable links 615 for controlling the viewing of various pictures in photograph repository 224. Exemplary pictures selectable links include a "Play Slide Show" selectable link 616, a "Settings" selectable link 618, a "Sort by Name" selectable link 620, a "Sort by Date" selectable link 622, a "My Pictures" selectable link 624 and a "Shared Pictures" selectable link 626.

Figure 6A:
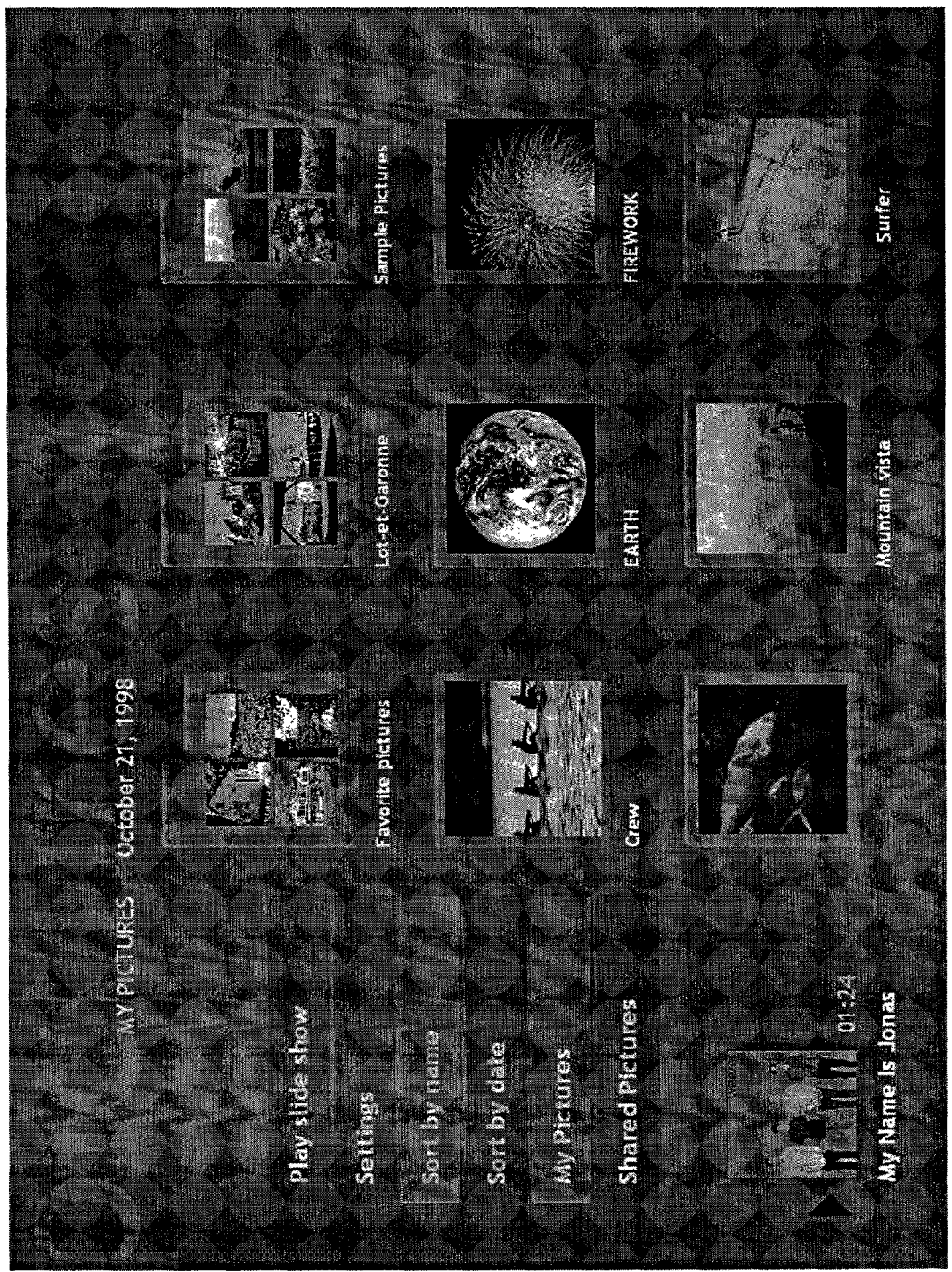
FIG. 6A is an illustrative screen shot of the exemplary pictures display of FIG. 6.

The "Play Slide Show" selectable link 616 can be navigated to by end-user 214 and, when followed, presents an automatic display of a group of pictures stored on the computer system 100. Following pictures "Settings" link 618 allows a user to modify certain display options of pictures display area 600. Selecting the "Sort by Name" selectable link 620 sorts the various thumbnails 610 and 614 in alphabetical order. Selecting the "Sort by Date" selectable link 622 sorts the thumbnails 610 and 614 by date. The "My Pictures" selectable link 624 is a link that can display a certain folder's contents, such as the "My Pictures" folder found within the WINDOWS Operating System. Similarly, the "Shared Pictures" link 626 can be used to display thumbnail previews of pictures within a certain directory such as a "My Pictures" directory. It is understood to one of ordinary skill in the art that various folders could be preconfigured in addition to the "My Pictures" folder. Also included on the pictures display area 600 is the now playing area 324 with the now playing identifier 324A. A screen shot of an exemplary pictures display area 600 is provided in FIG. 6A.

Figure 7:
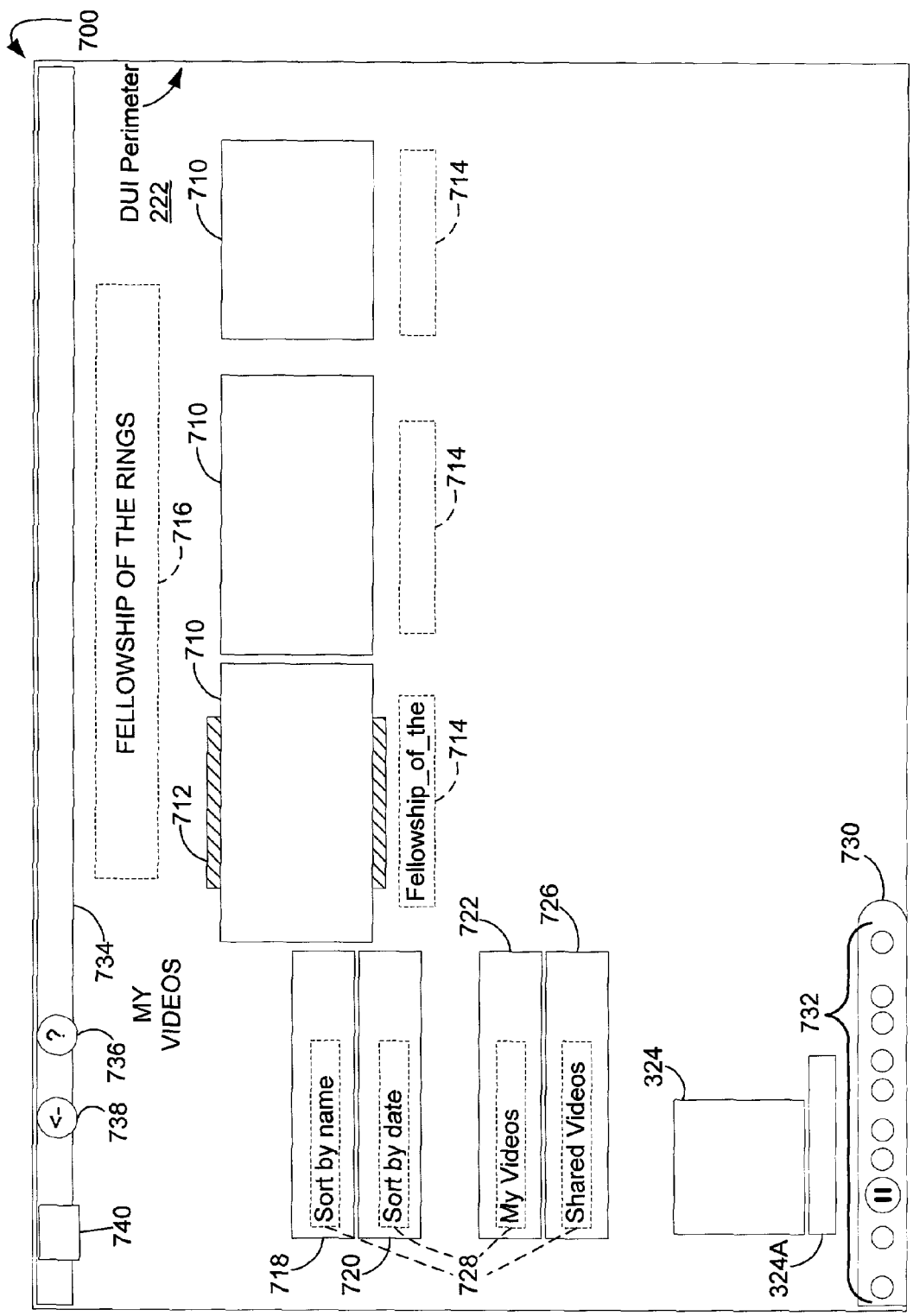
FIG. 7 is a diagram of an exemplary videos display of the present invention.
Figure 7A:
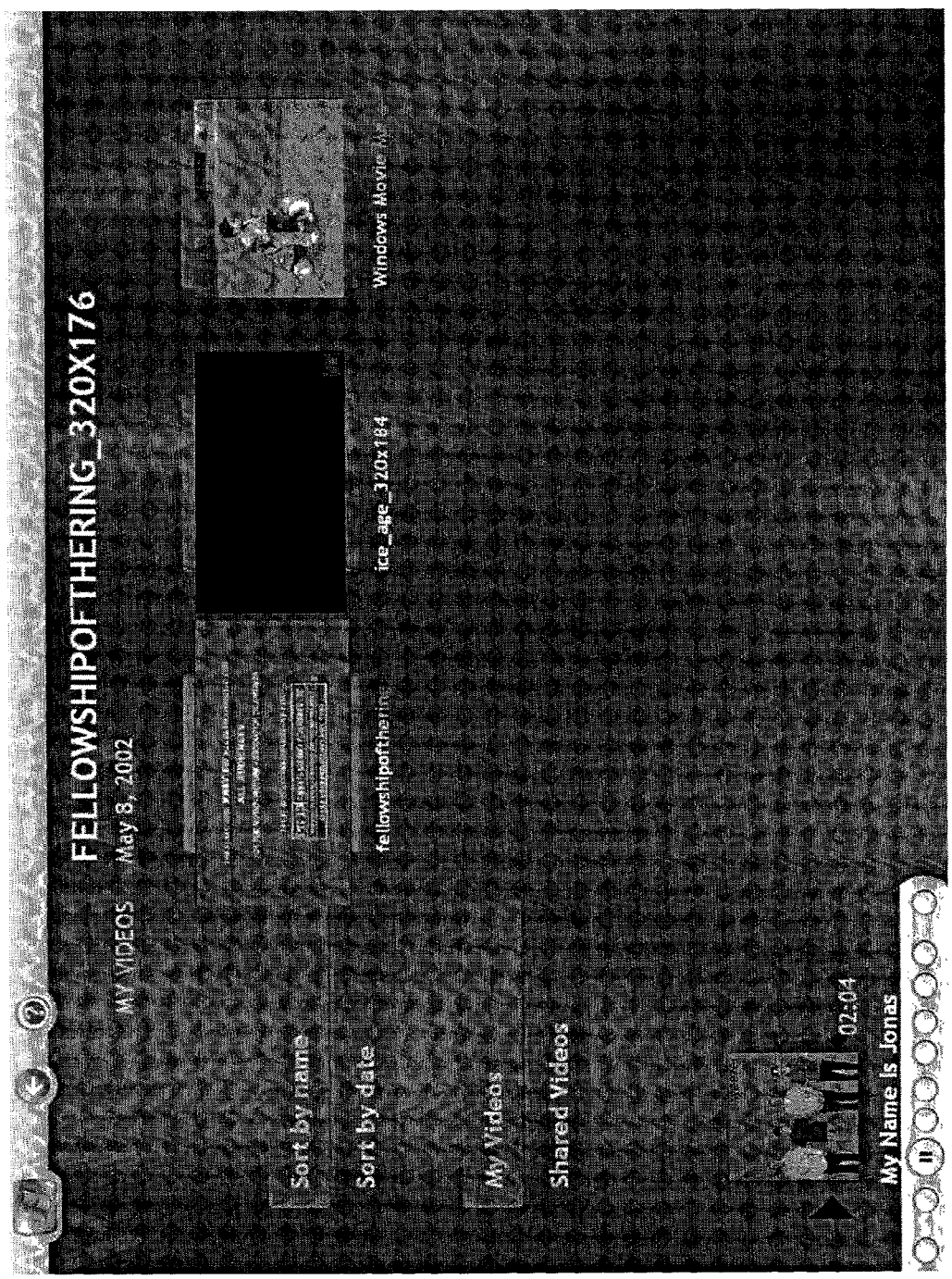
FIG. 7A is an illustrative screen shot of the exemplary videos display of FIG. 7.

Again, returning briefly to FIG. 3, following the "My Videos" selectable link 320 from menu display 300, a user is presented with a videos display referenced generally by the numeral 700 in FIG. 7. Videos display 700 includes a video thumbnail preview 710 of an available video stored in video repository 226, which can be hard drive 141. As the user shifts focus from various thumbnails of videos in display area 700, a video marker 712 can be presented to the end-user 214 indicating which item has the focus. The video marker 712 is provided to indicate which item has the focus of video display 700. Videos display 700 also includes a title bar 716 for displaying a title of a video observable from television-viewing distance 220. Also included in videos display 700 are a group of videos selectable links including a videos "Sort by Name" link 718, a videos "Sort by Date" link 720, a "My Videos" link 722, and a "Shared Videos" selectable link 726. Each of the aforementioned selectable links includes selectable link identifiers referenced generally by the numeral 728. The selectable link identifiers 728 need not be text but could be icons or symbols. Also depicted, for the first time, in FIG. 7 are two status bars including a now playing status bar 730 and a general status bar 734. The now playing status bar 730 includes a group of now playing buttons 732 to control what is being played in the now playing window 324. This now playing status bar 730 could be displayed only when a user presses a certain button on remote control 216 or directs a cursor to the lower left-hand portion of whichever screen the user is on. The second bar displayed on FIG. 7 (but which can be displayed on any of the aforementioned screens) is the general status bar 734. The general status bar 734 can also be displayed pressing a certain button on remote control 216 or can be displayed in response to moving the cursor to the top of DUI perimeter 222. Specialty buttons can be included on status bar 734 including a help button 736, a back button 738 or a Windows specialty button 740. An exemplary screen shot of videos display 700 is shown in FIG. 7A.

Figure 8:
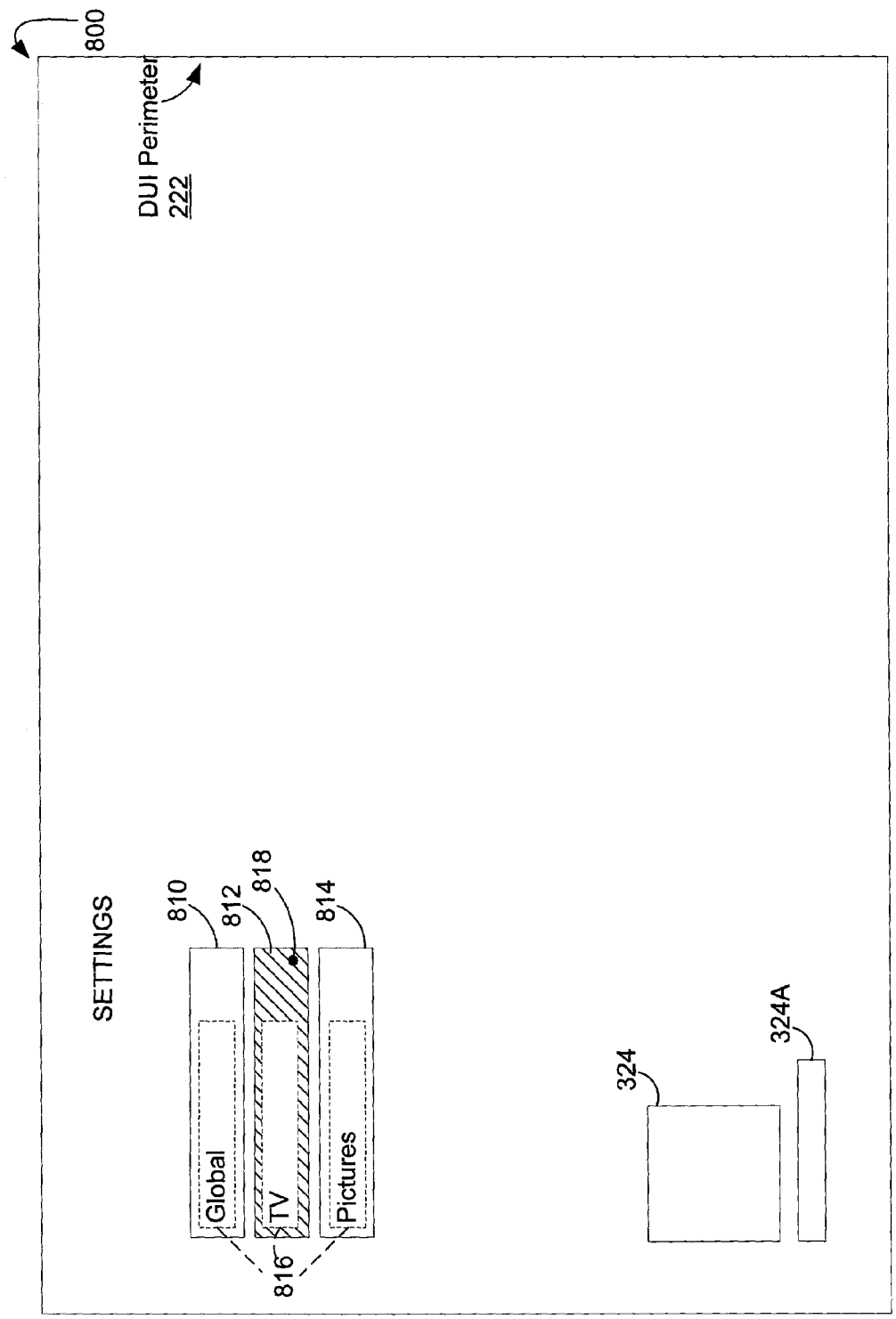
FIG. 8 is a diagram of an exemplary settings display of the present invention.
Figure 8A:
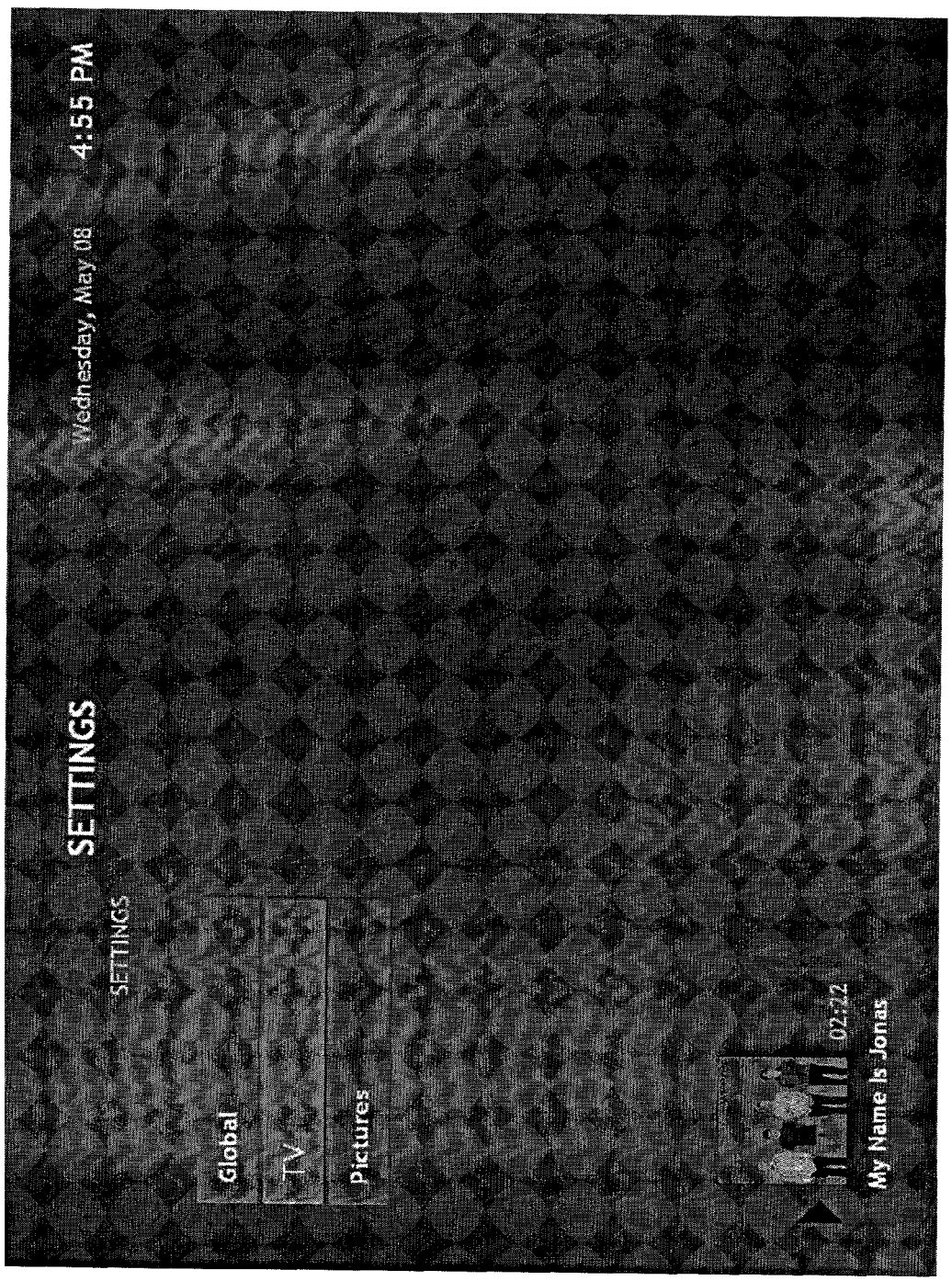
FIG. 8A is an illustrative screen shot of the exemplary settings display of FIG. 8.

Following the "Settings" selectable link 322, as shown in FIG. 3, leads a user to a "Settings" display referenced generally by the numeral 800 in FIG. 8. Included on "Settings" display 800 is a group of settings selectable links 816. A "Global" selectable link 810 modifies global settings, a "TV" selectable link 812 modifies TV settings and a "Pictures" selectable link 814 modifies settings related to displaying digital photographs. Each of these selectable links has a selectable link identifier referenced generally by the numeral 816. A "Settings" selectable link marker 818 denotes which selectable link has the focus. As with almost every other screen of the DUI, the now playing thumbnail 324 and corresponding identifier 324A can be displayed on "Settings" display 800. An exemplary screen shot of "Settings" display 800 is provided in FIG. 8A.

As can be understood, the method and system allow a user view and operate a computer from a television-viewing distance. In addition, a centralized display for enjoying media content on a computer is made possible by the present invention.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and with the scope of the claims.

What the invention claimed is:

1. A user interface embodied on one or more memory storage devices and executable on a computer, the user interface for operating a computer from a television-viewing distance, comprising:
a main menu display in a first layer including a first plurality of selectable links that are disposed within said first layer, each selectable link having a functional identifier discernable by a user from a television-viewing distance, said integrated main menu display being integrated within the user interface and allowing for the operation of said computer, wherein the user interface is viewable on a display device coupled to the computer, wherein the television-viewing distance measured in feet is half a viewable screen area of said display device measured in inches, and wherein the viewable screen area is a diagonal measure of the image displayed on the display device;
a selectable-link marker indicating which of the first plurality of selectable links has the focus;
a screen-area inset that persistently presents a selected media content while navigating from a first screen to a second screen in said user interface, said screen-area inset being disposed within said layer, wherein the selected media content that is presented on the first screen continues to be presented on the second screen;
a secondary menu display that presents a second plurality of selectable links incident to a selection of one of said first plurality of selectable links,
wherein said secondary menu display
(A) renders unviewable said main menu display, including said first plurality of selectable links, and
(B) presents media options accessible by said second plurality of selectable links, which are topically related to said selected one of said first plurality of selectable links, and
wherein said second plurality of selectable links each has a functional identifier discernable by a user from the television-viewing distance.

2. The user interface of claim 1, wherein at least two of the first plurality of selectable links are media-related links.

3. The user interface of claim 1, wherein said selected one of said first plurality of selectable links includes a television-viewing link and wherein said media options of said second plurality of selectable links include a television-viewing area for watching programming from a content provider.

4. The user interface of claim 1, wherein said second plurality of selectable links includes a programming-guide link for presenting a listing of available content from the content provider.

5. The user interface of claim 1, wherein the second plurality of selectable links includes a search link, whereby following the search link allows the user to initiate a search of available content.

6. The user interface of claim 1, wherein the selected one of the first plurality of selectable links includes at least one audio link and wherein the media options of the second plurality of selectable links include:

an audio-selection link pointing to a recording of music previously stored on the computer; and
a visual indication discernable from the television-viewing distance indicating what recording is currently being played.

7. The user interface of claim 6, wherein the media options include a music-search link pointing to a music search engine operable to initiate a search of music previously stored on the computer.

8. The user interface of claim 1, wherein the selected one of the first plurality of selectable links is an image link and wherein the media options of the second plurality of selectable links include a pictures-selection link pointing to pictures previously stored on the computer that are accessible by the computer.

9. The user interface of claim 8, wherein the media options of the second plurality of selectable links include a slide-show selection link pointing to a slide-show, wherein the slide-show is an automatic display of a group of pictures previously stored on the computer that are accessible by the computer.

10. The user interface of claim 1, wherein the selected one of the first plurality of selectable links includes a videos-link and wherein the media options of the second plurality of selectable links include a videos-selection link pointing to videos previously stored on the computer.

11. The user interface of claim 1, wherein the selected one of the first plurality of selectable links includes a settings link and wherein the media options of the second plurality of selectable links include a settings-selection pointing to a plurality of manipulatable settings options.

12. The user interface of claim 1, wherein the common media experience includes at least one of: a television program, a musical recording, or a picture.

13. The user interface of claim 1, wherein the common media experience includes a video recording previously stored on the computer that is played back from a storage location of said computer.

14. The user interface of claim 1, wherein said first screen is a home screen.

15. A computer-implemented method for utilizing a distance user interface having a first layer to operate a computer at a distance, the computer coupled to a display for processing user commands, comprising:
providing for the presentation of a first plurality of selectable links that can be utilized to operate said computer from a television-viewing distance, said integrated selectable links being integrated within said first layer, and wherein the television-viewing distance measured in feet is approximately half of a diagonal measure of the image displayed on the display device measured in inches;
providing for the presentation of an indication that at least one of the plurality of selectable links has a focus;
responding to a command received from a remote-control device that indicates a selection of at least one of said first plurality of selectable links;
presenting a screen-area inset in said first layer that persistently presents a common media experience while navigating from a first screen to a second screen in said distance user interface;
a secondary menu display that presents a second plurality of selectable links incident to a selection of one of said first plurality of selectable links,
wherein said secondary menu display
(A) renders unviewable said main menu display, including said first plurality of selectable links, and (B) presents media options accessible by said second plurality of selectable links, which are topically related to said selected one of said first plurality of selectable links, wherein said second plurality of selectable links each has a functional identifier discernable by a user from the television-viewing distance, and wherein at least one of said first or second plurality of selectable links is a search link, a music-find link, or a slide-show manipulation link.

16. The method of claim 15, wherein at least two of the first plurality of selectable links are media-related links.

17. The method of claim 15:

wherein said selected one of said first plurality of selectable links includes a television-viewing link; and wherein said media options of said second plurality of selectable links include a television-viewing area for watching programming from a content provider.

18. The method of claim 17, wherein said second plurality of selectable links includes a guide link for presenting a listing of available content from the content provider.

19. The method of claim 15, wherein the selected one of the first plurality of selectable links includes at least one audio link and wherein the media options of the second plurality of selectable links include:

an audio-selection link pointing to a recording of music previously stored on the computer; and a visual indication discernable from the television-viewing distance indicating what recording is currently being played.

20. The method of claim 19, wherein the media options include a music-search link pointing to a music search engine operable to initiate a search of music previously stored on the computer.

21. The method of claim 15:

wherein the selected one of the first plurality of selectable links is an image link; and wherein the media options of the second plurality of selectable links include a pictures-selection link pointing to pictures previously stored on the computer that are accessible by the computer.

22. The method of claim 21, wherein the media options of the second plurality of selectable links include a slide-show selection link pointing to a slide-show display of a group of pictures previously stored on the computer that are accessible by the computer.

23. The method of claim 15:

wherein the selected one of the first plurality of selectable links includes a videos-link; and wherein the media options of the second plurality of selectable links include a videos-selection link pointing to videos previously stored on the computer.

24. The method of claim 15:

wherein the selected one of the first plurality of selectable links includes a settings link; and wherein the media options of the second plurality of selectable links include a settings link pointing to a plurality of manipulatable settings options.

25. The method of claim 15, wherein the common media experience includes at least one of: a television program, a musical recording, or a picture.

26. The method of claim 15, wherein the common media experience includes a video recording previously stored on the computer that is played back from a storage location of said computer.

27. A computer programmed to perform the steps recited in the method of claim 15.

28. One or more memory storage devices having computer-executable instructions embodied thereon that are executable on a computer for presenting a distance user interface layer on a display device, the interface for facilitating the operation of a computer system from a television-viewing distance, comprising:

code for presenting a first plurality of selectable links in said links that are integrated into said graphical user interface and that are discernable from a television-viewing distance, wherein the television-viewing distance expressed in feet is one-half of the display size expressed in inches, and wherein the viewable screen area is a diagonal measure of the image displayed on the display device;

code for presenting an indication in said layer that at least one of said plurality of selectable links has a focus;

code for presenting a screen-area inset in said layer that persistently presents a common media experience while navigating from a first screen to a second screen in said distance user interface; and wherein at least one of said first or second plurality of selectable links is a search link, a music-find link, or a slide-show manipulation link.

29. The one or more memory storage devices of claim 28, wherein at least two of the first plurality of selectable links are media-related links.

30. The one or more memory storage devices of claim 28, further comprising:

code for presenting a secondary menu display having a second plurality of selectable links accessed by following a selected one of said first plurality of selectable links, wherein said second plurality of selectable links present media options topically related to said selected one of said first plurality of selectable links, and wherein said second plurality of selectable links each has a functional identifier discernable by a user from the television-viewing distance.

31. The one or more memory storage devices of claim 30, wherein said second plurality of selectable links includes a recorded-content link for presenting a listing of available content from the content provider.

32. The one or more memory storage devices of claim 31, wherein the recorded content includes content communicated to the computer.

33. The one or more memory storage devices of claim 30, wherein the media options of the second plurality of selectable links include slide-show selection link pointing to a slide-show display of a group of pictures previously stored on the computer that are accessible by the computer.

34. The one or more memory storage devices of claim 30:

wherein the selected one of the first plurality of selectable links includes a videos-link; and wherein the media options of the second plurality of selectable links include a videos-selection link pointing to videos previously stored on the computer.

35. The one or more memory storage devices of claim 28:

wherein said selected one of said first plurality of selectable links is a television viewing link, and wherein said media options of said second plurality of selectable links include a television-viewing area for watching programming from a content provider.

36. The one or more memory storage devices of claim 28, wherein the selected one of the first plurality of selectable links includes at least one audio link and wherein the media options of the second plurality of selectable links include:

an audio-selection link pointing to a recording of music previously stored on the computer; and a visual indication discernable from the television-viewing distance indicating what recording is currently being played.

37. The one or more memory storage devices of claim 28, wherein the media options include a music-search link pointing to a music search engine operable to initiate a search of music previously stored on the computer.

38. The one or more memory storage devices of claim 28:
wherein the selected one of the first plurality of selectable links is an image link; and
wherein the media options of the second plurality of selectable links include a pictures-selection link pointing to pictures previously stored on the computer that are accessible by the computer.

39. The one or more memory storage devices of claim 28:
wherein the selected one of the first plurality of selectable links includes a settings link; and
wherein the media options of the second plurality of selectable links include a settings link pointing to a plurality of manipulatable settings options.

40. The one or more memory storage devices of claim 28, wherein the common media experience includes at least one of: a television program, a musical recording, or a picture.

41. The one or more memory storage devices of claim 28, wherein the common media experience includes a video recording previously stored on the computer that is played back from a storage location of said computer system.

* * * * *